(12) United States Patent
Besehanic

(10) Patent No.: US 12,341,859 B2
(45) Date of Patent: *Jun. 24, 2025

(54) SYSTEMS, METHODS, AND APPARATUS TO IDENTIFY MEDIA DEVICES

(71) Applicant: The Nielsen Company (US), LLC, New York, NY (US)

(72) Inventor: Jan Besehanic, Tampa, FL (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/648,868

(22) Filed: Apr. 29, 2024

(65) Prior Publication Data

US 2024/0406281 A1   Dec. 5, 2024

Related U.S. Application Data

(63) Continuation of application No. 18/185,718, filed on Mar. 17, 2023, now Pat. No. 11,985,203, which is a
(Continued)

(51) Int. Cl.
*H04L 67/50* (2022.01)
*H04H 60/32* (2008.01)
*H04L 61/103* (2022.01)
*H04L 61/2514* (2022.01)
*H04L 61/5014* (2022.01)

(52) U.S. Cl.
CPC .......... *H04L 67/535* (2022.05); *H04H 60/32* (2013.01); *H04L 61/103* (2013.01); *H04L 61/2514* (2013.01); *H04L 61/5014* (2022.05)

(58) Field of Classification Search
CPC ....... H04H 60/32; H04L 67/22; H04L 61/103; H04L 61/2514; H04L 61/2015
See application file for complete search history.

(56) References Cited

U.S. PATENT DOCUMENTS 5,751,967 A   5/1998   Raab et al.
7,996,894 B1  8/2011   Chen et al.
(Continued)

OTHER PUBLICATIONS

United States Patent and Trademark Office, Final Office Action, issued in connection with U.S. Appl. No. 17/886,441, dated Apr. 26, 2024, 20 pages.
(Continued)

*Primary Examiner* — Michael A Keller

(57) ABSTRACT

Systems, methods, and apparatus to identify media devices are disclosed. An example network communications monitor includes network interface circuitry, computer readable instructions, and processor circuitry. The processor circuitry is to execute the computer readable instructions to detect, via the network interface circuitry, multiple network communications transmitted on a home network within the household, access panelist data that associates a panelist of the household with a panelist device of the panelist, determine, based on the panelist data, that one or more of the multiple network communications are associated with the panelist device, and cause storage of data identifying the one or more network communications in association with the panelist.

20 Claims, 13 Drawing Sheets

Related U.S. Application Data continuation of application No. 17/956,450, filed on Sep. 29, 2022, now Pat. No. 11,652,901, which is a continuation of application No. 17/328,860, filed on May 24, 2021, now Pat. No. 11,652,899, which is a continuation of application No. 16/834,842, filed on Mar. 30, 2020, now Pat. No. 11,019,164, which is a continuation of application No. 16/404,366, filed on May 6, 2019, now Pat. No. 10,609,166, which is a continuation of application No. 15/588,245, filed on May 5, 2017, now Pat. No. 10,284,665, which is a continuation of application No. 13/931,750, filed on Jun. 28, 2013, now Pat. No. 9,647,779.

(60) Provisional application No. 61/814,792, filed on Apr. 22, 2013.

(56) References Cited

U.S. PATENT DOCUMENTS

| | | | |
|---|---|---|---|
| 8,209,740 B1 | 6/2012 | Kulaga et al. | |
| 8,843,953 B1 | 9/2014 | Dang et al. | |
| 9,032,477 B2 | 5/2015 | Ranjan et al. | |
| 9,721,073 B2 | 8/2017 | Schröder et al. | |
| 10,482,890 B2 | 11/2019 | Srinivasan et al. | |
| 11,265,286 B2 | 3/2022 | Mermoud et al. | |
| 11,924,646 B2 | 3/2024 | Singh et al. | |
| 2003/0037163 A1 | 2/2003 | Kitada et al. | |
| 2004/0040023 A1 | 2/2004 | Ellis et al. | |
| 2008/0134165 A1 | 6/2008 | Anderson et al. | |
| 2009/0172443 A1 | 7/2009 | Rothman et al. | |
| 2011/0013806 A1 | 1/2011 | Zuev et al. | |
| 2011/0138064 A1 | 6/2011 | Rieger et al. | |
| 2013/0005296 A1 | 1/2013 | Papakostas et al. | |
| 2013/0070639 A1* | 3/2013 | Demura | H04L 61/103 370/254 |
| 2013/0132152 A1* | 5/2013 | Srivastava | G06Q 30/0201 705/7.29 |
| 2014/0244828 A1 | 8/2014 | Besehanic | |
| 2014/0317114 A1 | 10/2014 | Alla et al. | |
| 2015/0207667 A1 | 7/2015 | Basso et al. | |
| 2015/0222939 A1 | 8/2015 | Gallant et al. | |
| 2015/0277856 A1 | 10/2015 | Payne et al. | |
| 2015/0327052 A1 | 11/2015 | Ghai | |
| 2016/0254946 A1 | 9/2016 | Prevost et al. | |
| 2017/0041410 A1 | 2/2017 | Bosworth et al. | |
| 2017/0060918 A1 | 3/2017 | Iyer et al. | |
| 2017/0280266 A1 | 9/2017 | Brisebois | |
| 2018/0048534 A1 | 2/2018 | Banga et al. | |
| 2019/0058907 A1 | 2/2019 | Schenker et al. | |
| 2020/0169528 A1 | 5/2020 | Le et al. | |
| 2020/0213352 A1 | 7/2020 | Fainberg et al. | |
| 2021/0011705 A1 | 1/2021 | Liu et al. | |
| 2021/0136084 A1 | 5/2021 | Dayan | |
| 2021/0243603 A1 | 8/2021 | Yin et al. | |
| 2021/0266258 A1 | 8/2021 | Sheu et al. | |
| 2021/0281516 A1 | 9/2021 | Hatta et al. | |

OTHER PUBLICATIONS

*The Nielsen Company (US), LLC* v. *HyphaMetrics, Inc.*, Case No. 23-136-GBW-CJB, HyphaMetrics' Final Invalidity Contentions, Oct. 9, 2024, 9 pages.

*The Nielsen Company (US), LLC* v. *HyphaMetrics, Inc.*, Case No. 23-136-GBW-CJB, Exhibit A1 accompanying HyphaMetrics' Final Invalidity Contentions, Oct. 9, 2024, 28 pages.

*The Nielsen Company (US), LLC* v. *HyphaMetrics, Inc.*, Case No. 23-136-GBW-CJB, Exhibit A3 accompanying HyphaMetrics' Final Invalidity Contentions, Oct. 9, 2024, 18 pages.

USPTO, Non-final Office Action dated Sep. 18, 2024 in U.S. Appl. No. 17/886,441, 23 pages.

*The Nielsen Company (US), LLC* v. *HyphaMetrics, Inc.*, Case No. 23-136-GBW-CJB, HyphaMetrics, Inc.'s Opening Brief in Support of Motion for Summary Judgment, Mar. 10, 2025, 21 pages.

*The Nielsen Company (US), LLC* v. *HyphaMetrics, Inc.*, Defendant's Responsive to Plaintiff's Sur-Reply Addressing the Recently Decided Recentive Analytics Case, C.A. No. 23-136-GBW-CJB, dated May 9, 2025, 3 Pages.

*The Nielsen Company (US), LLC* v. *HyphaMetrics, Inc.*, Plaintiff's Sur-reply Brief Opposing Defendant's Motions for Summary Judgment, C.A. No 23-136-GBW-CJB, dated May 6, 2025, 10 Pages.

*The Nielsen Company (US), LLC* v. *HyphaMetrics, Inc.*, Hyphametrics, Inc.'s Reply Brief in Support of Its Motion for Summary Judgment, C.A. No. 23-136-GBW-CJB, dated Apr. 28, 2025, 21 Pages.

*The Nielsen Company (US), LLC* v. *HyphaMetrics, Inc.*, Plaintiff's Answering Brief Opposing Defendant's Motions for Summary Judgment, C.A. No. 23-136-GBW-CJB, dated Apr. 14, 2025, 52 Pages.

* cited by examiner

402

| MAC ADDRESS | DEVICE IDENTIFIER |
|---|---|
| 00:22:34:CD:56:EF | PANELIST0001_XBOX01 |
| 00:19:AB:34:CD:12 | PANELIST0001_PLAYSTATION01 |
| 4C:B1:99:12:EF:1A | PANELIST0001_IPAD01 |
| 4C:B1:99:34:CD:86 | PANELIST0001_IPAD02 |
| A0:D2:B1:BD:DC:66 | PANELIST0001_SMARTTV01 |

480 → MAC ADDRESS
485 → DEVICE IDENTIFIER
490 → row 1
491 → row 2
492 → row 3
493 → row 4
494 → row 5

FIG. 4B

SYSTEMS, METHODS, AND APPARATUS TO IDENTIFY MEDIA DEVICES

CROSS-REFERENCE TO RELATED APPLICATIONS

This application is a continuation of U.S. patent application Ser. No. 18/185,718, filed on Mar. 17, 2023, now U.S. Pat. No. 11,985,203, which is a continuation of U.S. patent application Ser. No. 17/956,450, filed on Sep. 29, 2022, now U.S. Pat. No. 11,652,901, which is a continuation of U.S. patent application Ser. No. 17/328,860, filed on May 24, 2021, now U.S. Pat. No. 11,652,899, which is a continuation of U.S. patent application Ser. No. 16/834,842, filed on Mar. 30, 2020, now U.S. Pat. No. 11,019,164, which is a continuation of U.S. patent application Ser. No. 16/404,366, filed on May 6, 2019, now U.S. Pat. No. 10,609,166, which is a continuation of U.S. patent application Ser. No. 15/588,245, filed on May 5, 2017, now U.S. Pat. No. 10,284,665, which is a continuation of U.S. patent application Ser. No. 13/931,750, filed on Jun. 28, 2013, now U.S. Pat. No. 9,647,779, which claims the benefit of U.S. Provisional Application No. 61/814,792, filed on Apr. 22, 2013, each of which is hereby incorporated by reference in its entirety.

FIELD OF THE DISCLOSURE

This disclosure relates generally to monitoring network activity, and, more particularly, to systems, methods, and apparatus to identify media devices.

BACKGROUND

Media providers and/or metering entities such as, for example, advertising companies, broadcast networks, etc. are often interested in the viewing, listening, and/or media behavior/interests of audience members and/or the public in general. To collect these behavior/interests, an audience measurement company may enlist panelists (e.g., persons agreeing to be monitored) to cooperate in an audience measurement study for a period of time. The media usage habits of these panelists as well as demographic data about the panelists is collected and used to statistically determine the size and demographics of an audience.

In recent years, more consumer devices have been provided with Internet connectivity and the ability to retrieve media from the Internet. As such, media exposure has shifted away from conventional methods of presentation, such as broadcast television, towards presentation via consumer devices accessing the Internet to retrieve media for display.

BRIEF DESCRIPTION OF THE DRAWINGS

FIG. 4B is an example MAC address to device identifier table that may be stored by the example network communications data store of the example network communications monitor of FIGS. 1 and/or 4 to associate a media access control (MAC) address with a device identifier.

DETAILED DESCRIPTION

Figure 1:
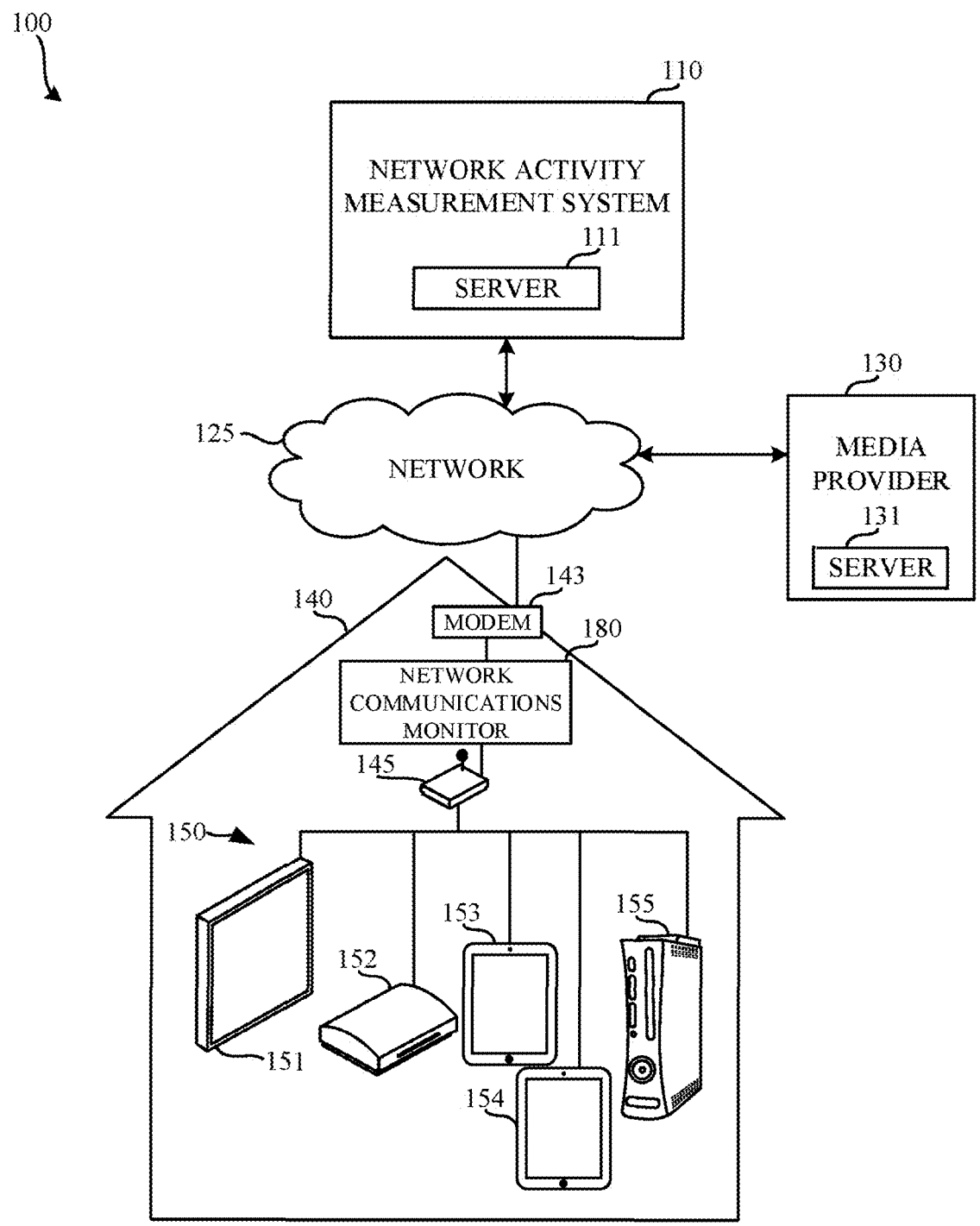
FIG. 1 is a block diagram of an example system to identify media presentation devices.

As used herein, the term "media" includes any type of content and/or advertisements, such as television programming, radio programming, news, movies, web sites, etc. Example methods, apparatus, and articles of manufacture disclosed herein identify media devices and/or types of media devices for media measurement. Such media devices may include, for example, Internet-enabled televisions, personal computers, Internet-enabled mobile handsets (e.g., a smartphone), video game consoles (e.g., Xbox®, Playstation® 3), tablet computers (e.g., an iPad®), digital media players (e.g., a Roku® media player, a Slingbox®, etc.), etc. In some examples, identifications of media devices used in consumer locations (e.g., homes, offices, etc.) are aggregated to determine ownership and/or usage statistics of available media devices, relative rankings of usage and/or ownership of media devices, types of uses of media devices (e.g., whether a device is used for browsing the Internet, streaming media from the Internet, etc.), and/or other types of media device information.

In some disclosed examples, a media device includes a network interface to transmit a request for media to be presented by the media device. In such examples, the media device requests media from a media provider via a network (e.g., the Internet). In some examples, the request for media is a HyperText Transfer Protocol (HTTP) request, a Session Initiation Protocol (SIP) message, a domain name service (DNS) query, a file transfer protocol (FTP) request, and/or any other type of request for media (e.g., content and/or advertisements).

Internet Service Providers (ISPs) typically provide a single public Internet protocol (IP) address for each media exposure measurement location (e.g., a media presentation location, a panelist household, an internet café, an office, etc.) receiving Internet services. In some examples, multiple devices (e.g., media devices) are communicatively coupled by a local area network (LAN) at a media exposure measurement location. In some examples, the LAN includes a router and/or gateway that accesses another network (e.g., the Internet) using a public IP address associated with the media exposure measurement location.

Within the LAN, individual media devices are given private IP addresses by, for example, a dynamic host control protocol (DHCP.) When a media device within the LAN transmits a request to a resource outside of the LAN (e.g., on the Internet,) the router and/or gateway translates the originating (private) IP address of the device making the query to the public address of the router and/or gateway before relaying the request outside of the LAN (e.g., to the Internet). Thus, when the resource outside of the LAN receives the request, the resource is able to transmit a return message (e.g., a response) to the LAN. On the return path, the router and/or gateway translates the destination IP address of the response to the private IP address of the requesting device so that the return message may be delivered to the media device that made the original request.

Some networks utilize Internet Protocol (IP) for communication. The IP address scheme utilizes IP addresses assigned to media devices. For example, a media device might be assigned an IP version 4 (IPv4) address of 192.168.0.2. Any other past, present, and or future addressing scheme may additionally or alternatively be used such as, for example, IP version 6 (IPv6). In some examples, IP addresses are dynamically assigned using DHCP. Both public and private IP addresses may be assigned using DHCP. In some examples, the IP address assignment is referred to as a lease. IP address leases are generally time-dependent in that they are only valid for a particular period of time (e.g., one day, one week, one month, etc.) After the expiration of the lease, the media device requests a new IP address from a DHCP server (e.g., a router, a server, etc.). Accordingly, more than one IP address might be associated with a media device over an extended period of time. For example, at a first time, the media device might be identified by an IP address of 192.168.0.2, while at a second time, the media device might be identified by an IP address of 192.168.0.3. Further, a second media device may be assigned the first IP address at the second time. Accordingly, identifying which device is associated with network requests occurring on a network based on the IP address alone is difficult.

Network interfaces of media devices are provided with a media access control (MAC) address. The MAC address is a serial number of the network interface of the media device. MAC addresses are used when issuing IP addresses to identify the media device to which the IP address is assigned. Unlike an IP address, the MAC address does not change over time. The MAC address of a media device is provided by the hardware manufacturer of the media device at the time of manufacture. In some examples, the MAC address may be changed at a later time (e.g., after manufacturing the device). In examples disclosed herein, the MAC address is a forty-eight bit identifier, and is typically represented as a twelve character hexadecimal identifier. However, any other representation may additionally or alternatively be used. For example, the MAC address convention may change over time to use different numbers and/or types of characters.

In some examples, the MAC address includes a twenty-four bit organizationally unique identifier (OUI). An OUI is used to identify the manufacturer and/or model of the media device. In some examples, the first twelve bits of the OUI identify a manufacturer, while the second twelve bits of the OUI identify a model of the device. Accordingly, a manufacturer and/or model of a device may be identified based on the OUI. The OUI, however, does not distinguish between multiple media devices of the same manufacturer and model. For example, a first iPad may have the same OUI as a second iPad. However, the devices will be uniquely identified by the remainder of the MAC address (e.g., the portion of the MAC address following the OUI).

When transmitting network communications (e.g., transmission control protocol (TCP) communications, user datagram protocol (UDP) communications, etc.) the MAC address of the media device is not included. Rather, the IP address is used to identify the media device. As disclosed above, the IP address may change over time and, therefore, may not accurately identify the media device. To translate an IP address into a MAC address, media devices include an address resolution protocol (ARP) table. However, any other type of table may additionally or alternatively be used such as, for example a neighbor discovery protocol (NDP) (e.g., for use with IP version 6 (IPv6)). The ARP table enables translation from an IP address to a MAC address. The ARP table is maintained by media devices (e.g., a router and/or a gateway). Accordingly, a media device can be associated with network communications even though the IP address associated with the media device may change.

In some examples, network resources (e.g., servers providing media to the media devices) are identified by domain names. Domain names are human readable identifiers that identify a network resource. While an IP address of a network resource might change over time, the domain name typically remains the same. Domain names typically remain the same because they are purchased by the media provider as a way for users to easily identify the service provided by the service provider. As the IP address of the media provider changes (e.g., because the media provider is now hosting their service via a different server, etc.), the domain name is updated to be associated with the most recent IP address.

In some examples, media devices that are capable of individually being monitored via an on-device meter are used within the media exposure measurement location. The monitored media device may be, for example, a personal computer, a smart phone, a tablet, etc. In some examples, the on-device meter collects monitoring information regarding the network communications and/or activities of the media device. In some examples, the on-device meter collects information in addition to the network communications of the monitored media device such as, for example, indicia of user input, indicia of information presented by the monitored network device, etc.

However, not all media devices are amenable to being monitored by an on-device meter. For example some media devices do not allow installation of third-party software (e.g., an on-device meter). Further, because of the many types of media devices available, maintaining software packages for every type of media device is difficult. Because installation of a monitoring system on all types of network devices is difficult, if not impossible, some network devices may go unmonitored.

In examples disclosed herein, a device identifier is used to identify the media device. For example, a media device may be associated with a panelist and/or a household, and may receive a unique device identifier (e.g., "Suzie's iPAD", "Smith Family iPad 01", etc.) to facilitate such association. In some examples, the MAC address is associated with the device identifier. In examples disclosed herein, the assignment of the unique device identifier and the association with a MAC address of the device is made by an installer (e.g., a representative of a media monitoring entity) and/or by a user of the media device. However, any other party may assign and/or associate the device identifier with the media device and/or the MAC address of the media device.

In examples disclosed herein, a network communications monitor is used to capture network communications of media devices on the network (e.g., a home network). The network communications monitor is installed at the media exposure measurement location and identifies network communications to and/or from media devices within the media exposure measurement location (e.g., the communications of devices sharing a public IP address via, for example, a gateway). Thus, the network communications monitor monitors all network devices within the media exposure measurement location. The network communications monitor creates a log and/or a record of the network communications, identifies a device associated with the network communications (e.g., a device that originated and/or is to receive the network communication), and electronically transmits the log and/or the record to the network activity measurement system (e.g., to an audience measurement such as The Nielsen Company (US), LLC). In examples disclosed herein, the network communications monitor determines a device identifier of the identified device based on a MAC address of the device involved in the network communications. While the MAC address is not contained in the network communications itself, it can be derived by using, for example, an address resolution protocol (ARP) lookup. In some examples, the log of network communications created by the network communications monitor may be transmitted by physically mailing the log (e.g., a log stored on a memory device such as, for example, a flash memory, a compact disc, a DVD, etc.)

Some example methods, apparatus, and articles of manufacture disclosed herein are located at a media exposure measurement location having one or more media devices. Some of these example methods, apparatus, and articles of manufacture are interposed between the media devices and a wide area network (WAN), such as the Internet, that includes one or more media providers that provide media in response to request(s) from the media devices. Some example methods, apparatus, and articles of manufacture disclosed herein intercept messages to and/or from the WAN (e.g., media requests (e.g., HTTP requests) from media devices on the same LAN as the intercepting method, apparatus, or article of manufacture.) When intercepting messages to and/or from the WAN, in some examples, the network communications monitor identifies an internal (e.g., private) IP address associated with the intercepted message (e.g., a destination IP address or a source IP address). In some examples, the internal IP address is used when determining the MAC address of the media device associated with the intercepted message.

Some example methods, apparatus, and articles of manufacture disclosed herein inspect the network communications to determine if the network communications should be recorded. Not all network requests are of interest to the monitoring entity. For example, when the network communications monitor identifies hypertext transfer protocol (HTTP) requests, the network communications are transmitted to a network activity measurement system and/or stored for transmission to the network activity measurement system at a later time. In contrast, when the network communications monitor identifies a message not associated with media presentation (e.g., a border gateway protocol (BGP) message), the network communications monitor may ignore such a message. In some other examples, the message may be ignored when a device identifier and/or a MAC address cannot be determined. Some such example methods, apparatus, and articles of manufacture additionally or alternatively determine ownership and/or usage statistics based on messages from the WAN to the media devices on the LAN. Some example methods, apparatus, and articles of manufacture disclosed herein determine the type(s) of media device based on the network communications (e.g., via HTTP queries contained in the communications, via a MAC address associated with the media device, via a device identifier associated with the media device, etc.) but, unlike media providers that track usage statistics, do not return media to the media device(s) in response to the network communications.

FIG. 1 is a block diagram illustrating an example system 100 to identify media devices shown in an example environment of use. The example system of FIG. 1 includes a network activity measurement system 110, and a network communications monitor 180. The network communications monitor 180 monitors communications across a network 125. The example environment of FIG. 1 includes the network 125, an example media exposure measurement location 140, and an example media provider 130. The example media exposure measurement location 140 of FIG. 1 includes an example network gateway 145, an example modem 143, and example network devices 150. The network gateway 145 is able to communicate with, for example, the example media provider 130 via the network 125. In the illustrated example, network devices 150 include a first media device 151, a second media device 152, a third media device 153, a fourth media device 154, and a fifth media device 155.

The network activity measurement system 110 of the illustrated example comprises a server 111 that collects and processes network communications from the media devices 150 to generate media device information. The server 111 of the network activity measurement system 110 of FIG. 1 analyzes the network communications across multiple measurement locations such as the example measurement location 140 to identify, for example, which media devices are the most owned, the most-frequently used, the least-frequently owned, the least-frequently used, the most/least-frequently used for particular type(s) and/or genre(s) of media, and/or any other media statistics or aggregate information that may be determined from the data. The media device information may also be correlated or processed with factors such as geodemographic data (e.g., a geographic location of the media exposure measurement location, age(s) of the panelist(s) associated with the media exposure measurement location, an income level of a panelist, etc.) Media device information may be useful to manufacturers and/or advertisers to determine which features should be improved, determine which features are popular among users, identify geodemographic trends, occurrence(s) related to and/or behaviors of (e.g., demographic group(s) in physical geographic area(s) (e.g., North America, the South Eastern US, etc.)) with respect to media devices, identify market opportunities, and/or otherwise evaluate their own and/or their competitors' products. In some examples, the network activity measurement system is a central measurement system that receives and/or aggregates monitoring information collected at multiple different measurement sites.

The network 125 of the illustrated example of FIG. 1 is a wide area network (WAN) such as the Internet. However, in some examples, local networks may additionally or alternatively be used. For example, multiple networks may be utilized to couple the components of the example system 100 to identify media devices.

In the illustrated example, the media devices 150 of FIG. 1 are devices that retrieve media from the media provider 130 (e.g., via gateway 145) for presentation at the media exposure measurement location 140. In some examples, the media devices 150 are capable of directly presenting media (e.g., via a display) while, in some other examples, the media devices 150 present the media on separate media presentation equipment (e.g., speakers, a display, etc.). The first media device 151 of the illustrated example is an Internet enabled television, and thus, is capable of directly presenting media (e.g., via an integrated display and speakers). The second media device 152 of the illustrated example is a first gaming console (e.g., Xbox®, Playstation® 3, etc.) and requires additional media presentation equipment (e.g., a television) to present media. The third media device 153 and the fourth media device 154 are tablet devices. In the illustrated example, the third media device 153 and the fourth media device 154 are the same type of device from the same manufacturer (e.g., both the third media device 153 and the fourth media device 154 are Apple iPads). Accordingly, the OUI (e.g., a manufacturer and/or device specific portion of the MAC address) of the third media device 153 and the fourth media device 154 are the same. The fifth media device 155 of the illustrated example is a second gaming console (e.g., Xbox®, Playstation® 3, etc.) and requires additional media presentation equipment (e.g., a television) to present media. Although the fifth media device 155 and the second media device 152 are both gaming consoles, they are not made by the same manufacturer and, accordingly, do not share the same OUI. While, in the illustrated example, an Internet enabled television, gaming consoles, and tablet devices are shown, any other type(s) and/or number(s) of media device(s) may additionally or alternatively be used. For example, Internet-enabled mobile handsets (e.g., a smartphone), tablet computers (e.g., an iPad®, a Google Nexus, etc.) digital media players (e.g., a Roku® media player, a Slingbox®, etc.,) etc. may additionally or alternatively be used. Further, while in the illustrated example five media devices are shown, any number of media devices may be used. In the illustrated example, media devices 150 may be wired devices (e.g., connected to the network communications monitor 180 via wired connection such as, for example, an Ethernet connection) the media devices 150 may additionally or alternatively be wireless devices (e.g., connected to the network communications monitor 180 via a wireless connection such as, for example, a WiFi connection, a Bluetooth connection, etc.)

The media provider 130 of the illustrated example of FIG. 1 includes a server 131 providing media (e.g., web pages, videos, images, advertisements, etc.). The media provider 130 may be implemented by any provider(s) of media such as a digital broadcast provider (e.g., a cable television service, a fiber-optic television service, etc.) and/or an on-demand digital media provider (e.g., Internet streaming video and/or audio services such as Netflix®, YouTube®, Hulu®, Pandora®, Last.fm®,) and/or any other provider of media services (e.g., streaming media services). In some other examples, the media provider 130 is a host for a web site(s). Additionally or alternatively, the media provider 130 may not be on the Internet. For example, the media provider may be on a private and/or semi-private network (e.g., a LAN.)

The media exposure measurement location 140 of the illustrated example of FIG. 1 is a panelist household. However, the media exposure measurement location 140 may be any other location, such as, for example an internet café, an office, an airport, a library, a non-panelist household, etc. While in the illustrated example a single media exposure measurement location 140 is shown, any number and/or type(s) of media exposure measurement locations may be used.

The modem 143 of the illustrated example of FIG. 1 is a modem that enables network communications of the media exposure measurement location 140 to reach the network 125. In some examples, the modem 143 is a digital subscriber line (DSL) modem, while in some other examples the modem 143 is a cable modem. In some examples, the modem 143 is a media converter that converts one communications medium (e.g., electrical communications, optical communications, wireless communications, etc.) into another type of communications medium. In the illustrated example, the modem 143 is separate from the network gateway 145. However, in some examples, the modem 143 may be a part of (e.g., integral to) the network gateway 145.

The example network gateway 145 of the illustrated example of FIG. 1 is a router that enables the media devices 150 to communicate with the network 125 (e.g., the Internet). In some examples, the example network gateway 145 includes gateway functionality such as modem capabilities. In some other examples, the example network gateway 145 is implemented in two or more devices (e.g., a router, a modem, a switch, a firewall, etc.).

In some examples, the example network gateway 145 hosts a LAN for the media exposure measurement location 140. In the illustrated example, the LAN is a wireless local area network (WLAN) that communicates wirelessly with the media devices 150, and allows the media devices 150 to transmit and receive data via the Internet. Alternatively, the network gateway 145 may be coupled to such a LAN.

The network communications monitor 180 of the illustrated example of FIG. 1 is a network device interposed between the LAN hosted by the example network gateway 145 and the network 125. Additionally or alternatively, the network communications monitor 180 may be a device on the LAN and/or integrated into the gateway 145. The network communications monitor 180 of the illustrated example identifies network communications from the media devices 150 within the media exposure measurement location 140. The network communications monitor 180 creates a record (e.g., a log) identifying which of the media device(s) 150 were involved in which of the network communications and transmits the record to the network activity measurement system 110. In some examples, the network communications monitor 180 determines which device was involved in the network communications by inspecting the network communications passing through the network communications monitor 180 for indicia that may identify the media device and/or may facilitate identification of the media device (e.g., an IP address that may be used to lookup a MAC address via an ARP table).

In some examples, the example network gateway 145 permits custom firmware and/or software to be loaded and/or executed. In some such examples, the network gateway 145 may be provided with firmware and/or software to implement the network communications monitor 180 (in whole or in part). In such an example, in addition to standard routing and/or modem behavior, the firmware and/or software monitors messages and/or data packets directed from the media devices 150 to the network 125 and/or directed from the network 125 to the media devices 150. As noted above, such monitoring functionality may be part of and/or shared with a separate device such as, for example, the network communications monitor 180.

Figure 2:
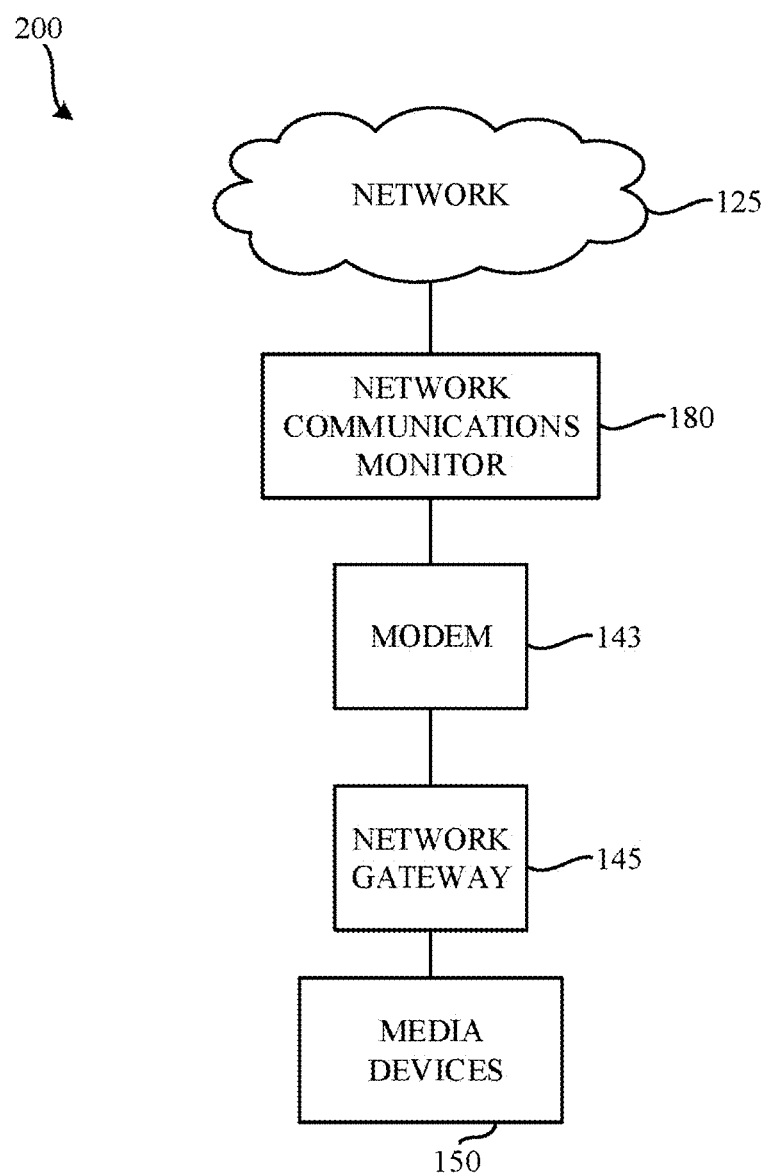
FIG. 2 is a block diagram of an example configuration of the media devices shown in FIG. 1.

FIG. 2 is a block diagram of an example configuration 200 of the local area network shown in FIG. 1. In the example configuration 200 of the illustrated example, the network communications monitor 180 is placed between the network 125 and the modem 143. The modem 143 communicates with the network gateway 145, which in turn communicates with the media devices 150.

In the illustrated example, the network communications monitor 180 monitors communications between the modem 143 and the network 125. For example, when the modem 143 is a DSL modem the network communications monitor 180 monitors the DSL communications. In the illustrated example, the network communications monitor 180 includes one or more ports (e.g., a DSL port, a cable port, etc.) for receiving and/or transmitting network communications.

Figure 3:
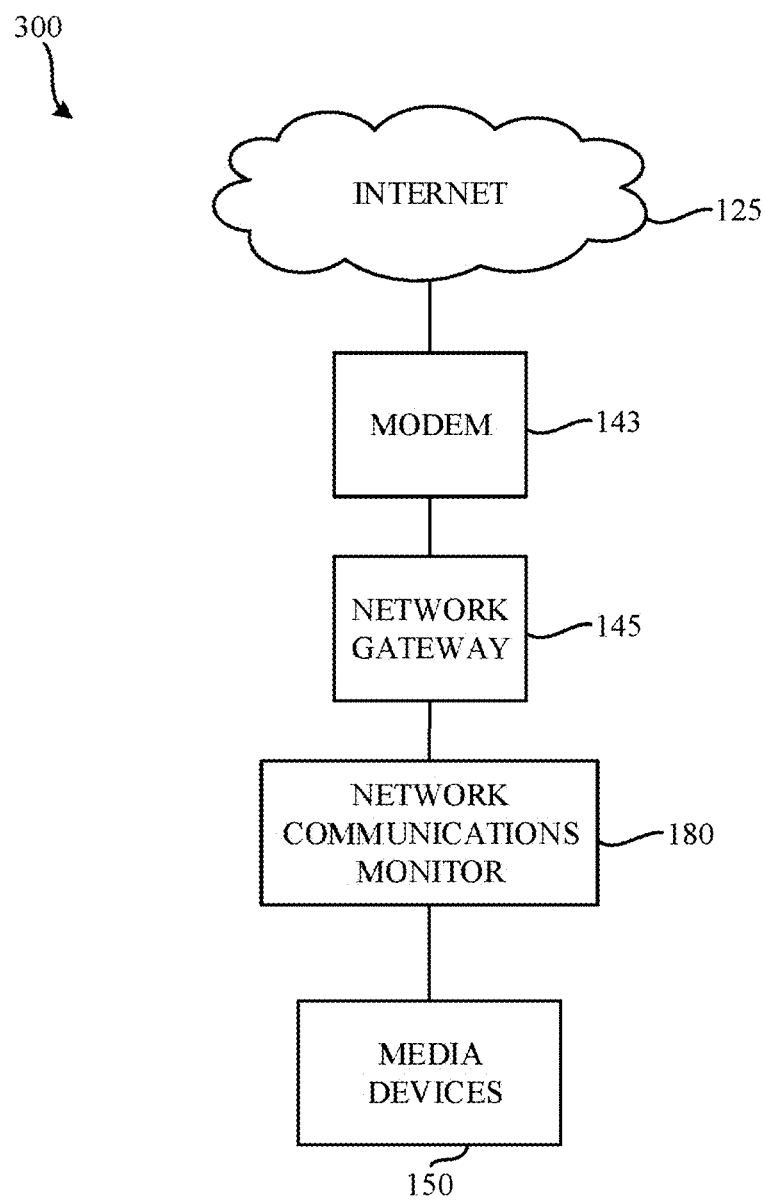
FIG. 3 is a block diagram of another example configuration of the media devices shown in FIG. 1.

FIG. 3 is a block diagram of another example configuration 300 of the LAN shown in FIG. 1. In the example configuration 300 of FIG. 3, the network communications monitor 180 is placed between the network gateway 145 and the media devices 150. Thus, the modem 143 communicates with the network gateway 145. The network gateway 145 communicates with the media devices 150, and those communications pass through the network communications monitor 180.

In the illustrated example of FIG. 3, the network communications monitor 180 monitors communications between the network gateway 145 and the media devices 150. In some examples, the network communications monitor 180 is a network routing device (e.g., a router, a switch, a hub, etc.) that monitors network communications. In the illustrated example, because the modem 143 and the network gateway 145 are adjacent, they may be combined into a single device. For example, a combined gateway and modem device may additionally or alternatively be used. In some examples, the network communications monitor 180 is additionally or alternatively integrated in the network gateway and/or in the modem 143.

Figure 4:
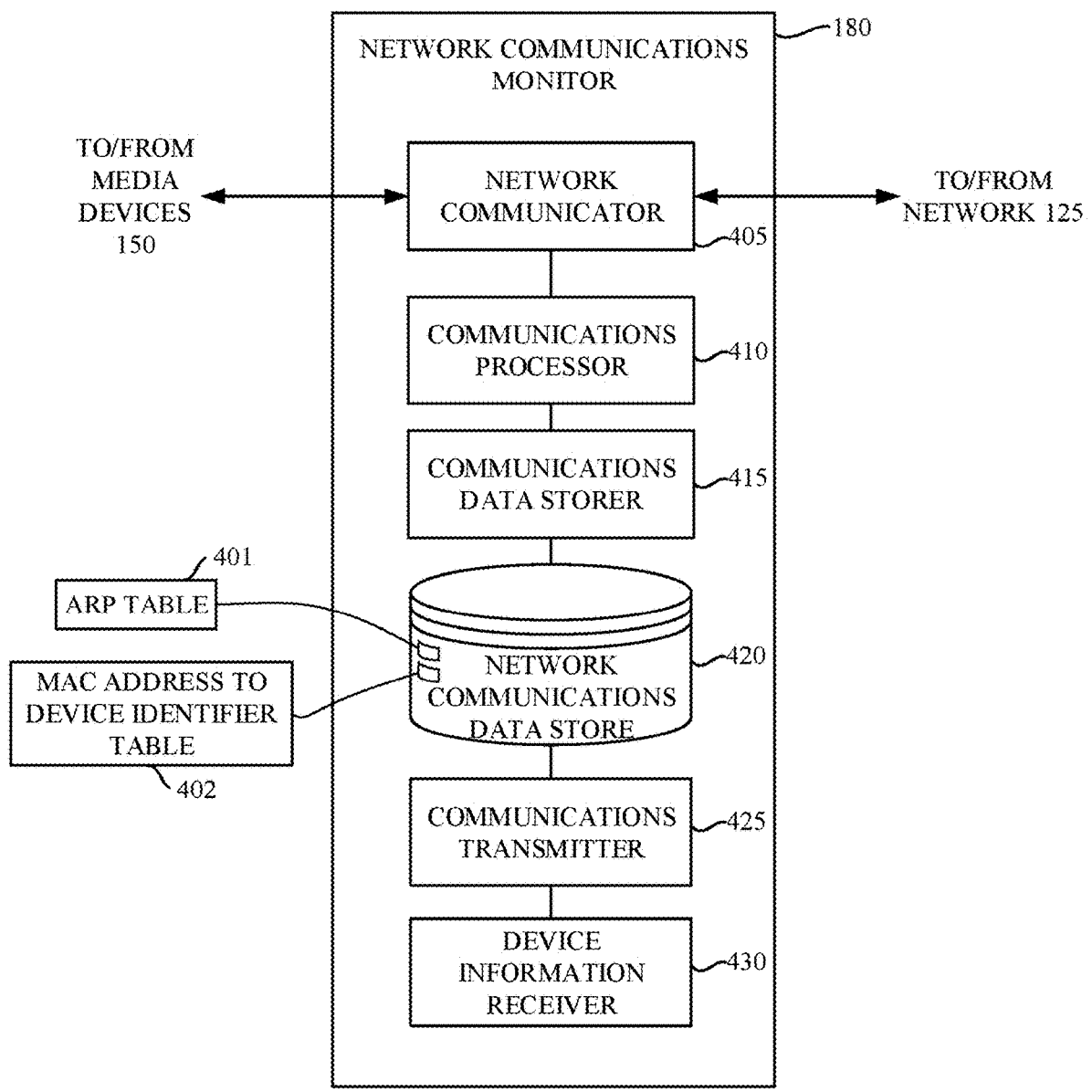
FIG. 4 is a block diagram of an example network communications monitor to implement the network communications monitor of FIG. 1.

FIG. 4 is a block diagram of an example network communications monitor 180 to implement the network communications monitor 180 of FIG. 1. The example network communications monitor 180 of FIG. 4 includes a network communicator 405, a communications processor 410, a communications data storer 415, a communications data store 420, a communications transmitter 425, and a device information receiver 430.

The network communicator 405 of the illustrated example of FIG. 4 is an Ethernet interface. In the illustrated example, the network communicator 410 receives network communications (e.g., HTTP requests, etc.) from the network gateway 145, the media devices 150, and/or the modem 143. The network communicator 405 transmits the network communications to the network 125, and receives and/or transmits network communications in the reverse path (e.g., towards the LAN). While in the illustrated example, the network communicator 405 is an Ethernet interface, any other type of interface may additionally or alternatively be used. For example, the network communicator 405 might include one or more of a Bluetooth interface, a WiFi interface, a digital subscriber line (DSL) interface, a T1 interface, etc. While in the illustrated example a single network communicator 405 is shown, any number and/or type(s) of network communicators may additionally or alternatively be used. For example, two network communicators (e.g., Ethernet interfaces) may be used. In such an example, a first network communicator may receive and/or transmit network communications to and/or from the network gateway 145 while a second network communicator may receive and/or transmit network communications to and/or from the network 125.

The communications processor 410 of the illustrated example of FIG. 4 inspects network communications received by the network communicator 405. The example communications processor 410 of FIG. 4 is implemented by a processor executing instructions, but it could alternatively be implemented by an Application Specific Integrated Circuit (ASIC), Digital Signal Processor (DSP), Field Programmable Gate Array (FPGA), or other circuitry. In the illustrated example, the communications processor 410 filters network communications received by the network communicator 405 to identify network communications of the media devices 150. Further, the communications processor 410 identifies the media device 150 involved in the network communications. In examples disclosed herein, the communications processor 410 identifies the media device 150 by determining a device identifier of the media device 150 and/or a MAC address of the media device 150.

The communications data storer 415 of the illustrated example of FIG. 4 stores network communications identified by the communications processor 410 in the network communications data store 420. The example data storer 415 of the illustrated example is implemented by a processor executing instructions, but it could alternatively be implemented by an ASIC, DSP, FPGA, or other circuitry. The communications processor 410 and the data storer 415 may be implemented by the same physical processor. In the illustrated example, network communications identified by the communications processor 410 are stored in association with the media device(s) 150 identified as receiving and/or transmitting network communications.

The network communications data store 420 of the illustrated example of FIG. 4 may be any device for storing data such as, for example, flash memory, magnetic media, optical media, etc. Furthermore, the data stored in the network communications data store 420 may be in any data format such as, for example, binary data, comma delimited data, tab delimited data, structured query language (SQL) structures, etc. While, in the illustrated example, the network communications data store 420 is illustrated as a single database, the network communications data store 420 may be implemented by any number and/or type(s) of databases. In the illustrated example, the network communications data store 420 stores an ARP table 401, and a MAC address to device identifier table 402. An example implementation of the ARP table 401 is further described in connection with FIG. 4A. An example implementation of the MAC address to device identifier table 402 is further described in connection with FIG. 4B.

The communications transmitter 425 of the illustrated example of FIG. 4 transmits network communications data stored in the network communications data store 420. In the illustrated example, the communications transmitter 425 is implemented by a processor executing instructions, but it could alternatively be implemented by an ASIC, DSP, FPGA, or other circuitry. The communications transmitter 425 may be implemented on the same physical processor as the communications processor 410 and/or the communications data storer 415. The communications transmitter 425 of the illustrated example periodically and/or a-periodically transmits network communications data from the network communications data store 420 to the network activity measurement system 110.

The example communications transmitter 425 may transmit the network communications data upon determining that the amount of network communications data stored in the network communication data store 420 has reached a threshold, and/or in response to a clock (e.g., a time limit specifying that network communications are transmitted once every day). Transmitting network communications every day ensures that there is little lag time between the occurrence of the network communications and the ability to analyze the network communications. However, the transmission may occur at any desired interval(s) such as, for example, transmitting once every hour, once every week, etc. In examples in which the transmission is triggered based on an amount of network communications data stored in the network communications data store 420, the transmission threshold might indicate that network communications should be transmitted if there is more than a threshold amount (e.g., one megabyte) of network communications data stored in the network communications data store 420. Any data storage amount may be used for such a trigger such as, for example, ten megabytes, one hundred megabytes, etc. Additionally or alternatively, multiple transmission thresholds may be present. For example, a threshold indicating that network communications data should be transmitted at least once a day and a threshold indicating that network communications data should be transmitted if more than one megabyte of network communications data is stored in the network communications data store 420 might be used.

In the illustrated example, the communications transmitter 425 transmits the network communications data via the network 125. However, the communications transmitter 425 may transmit network communications data via any other communication medium. For example, the network communications monitor 180 may be physically mailed to the network activity measurement system 110 and the communications transmitter 425 might transmit network communications data via, for example, a USB connection, a Bluetooth connection, a serial connection, a local area network (LAN), etc.

The example device information receiver 430 of the illustrated example of FIG. 4 receives and stores device identifiers in association with MAC addresses in the MAC address to device identifier table 402 of the network communications data store 420. In the illustrated example, the device information receiver 430 is implemented by a processor executing instructions, but it could alternatively be implemented by an ASIC, DSP, FPGA, or other circuitry. The device information receiver 430 may be implemented on the same physical processor as the communications processor 410, the communications data storer 415, and/or the communications transmitter 425. In the illustrated example, the device information receiver 430 provides a network accessible interface (e.g., a webpage) that is accessed via a separate device (e.g., a personal computer, a tablet computer, etc.). In examples disclosed herein, the device information receiver 430 stores a device identifier that is provided by an installer (e.g., a representative of a media monitoring entity (e.g., an audience measurement entity such as The Nielsen Company (US), LLC) and/or by a user of the media device. For each media device on the network, the installer and/or user enters a MAC address of the device and a respective device identifier of the corresponding media device into the interface of the device information receiver 430. The device information receiver 430 then stores the association of the MAC address and the device identifier in the MAC address to device identifier table 402, which may be used to identify the corresponding media device at a later time.

Figure 4A:
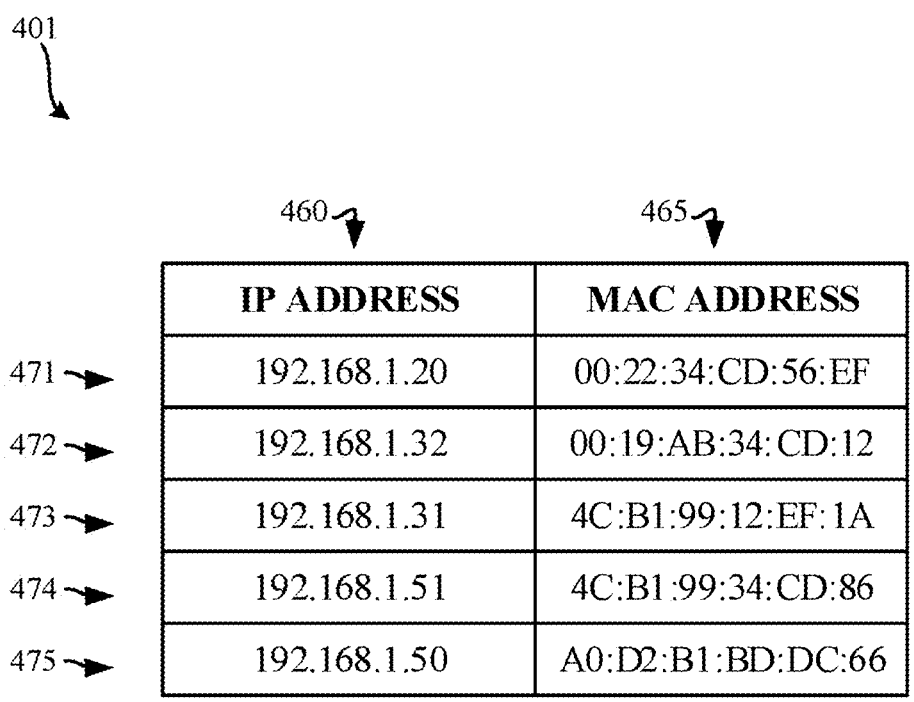
FIG. 4A is an example address resolution protocol (ARP) table that may be stored by the example network communications data store of the example network communications monitor of FIGS. 1 and/or 4 to associate an Internet protocol (IP) address with a media access control (MAC) address.

FIG. 4A is an example address resolution protocol (ARP) table 401 that may be stored by the example network communications data store of the example network communications monitor of FIGS. 1 and/or 4 to associate an Internet protocol (IP) address with a media access control (MAC) address. The example ARP table 401 is maintained by the network communicator 405. The ARP table 401 is updated by the network communicator 405 as IP addresses of media devices change (e.g., new IP addresses are issued via DHCP).

The example ARP table 401 of FIG. 4A includes an IP address column 460 and a MAC address column 465. In the illustrated example, the IP address column 460 represents a IP version 4 (IPv4) addresses of media devices on the LAN. However, any other type of address may additionally or alternatively be used such as, for example, an IPV6 address. In the illustrated example, the MAC address column 465 represents MAC addresses of media devices on the LAN. However, any other type of address may additionally or alternatively be used. Each row of the ARP table 401 of FIG. 4A represents a specific media device (i.e., the IP address and MAC address of a single media device).

The example ARP table 401 of the illustrated example of FIG. 4A includes five rows respectively associated with five different media devices on the LAN. A first row 471 corresponds to the first media device 151. A second row 472 corresponds to the second media device 152. A third row 473 corresponds to the third media device 153. A fourth row 474 corresponds to the fourth media device 154. A fifth row 475 corresponds to the fifth media device 155. In the illustrated example, the first six characters of the MAC address (described above as the OUI) of the third row 473 and the fourth row 474 are the same (e.g., "4C:B1:99"). In the illustrated example, the matching OUI indicates that the third media device 153 and the fourth media device 154 are of the same manufacturer and/or model.

FIG. 4B is an example MAC address to device identifier table 402 that may be stored by the example network communications data store of the example network communications monitor of FIGS. 1 and/or 4 to associate a media access control (MAC) address with a device identifier. The example MAC address to device identifier table 402 is updated by the device information receiver 430. The example MAC address to device identifier table 402 includes a MAC address column 480 and a device identifier column 485. Because MAC addresses are persistent, the association of the MAC address column 480 and the device identifier column 485 is also persistent. That is, device identifiers are permanently and/or semi-permanently associated with media devices at the media exposure measurement location 140. The example MAC address to device identifier table 402 includes five rows respectively associated with five different media devices at the media exposure measurement location 140. For example, a first iPad in the media exposure measurement location 140 is assigned a device identifier of "PANELIST0001_IPAD01" (row 492), while a second iPad in the media exposure measurement location is assigned a device identifier of "PANELIST0001_IPAD02" (row 493). The identifier of row 493 indicates that the second iPad is associated with the same panelist (e.g., the same person in the same household). However, the second iPad may be assigned and/or associated with any other device identifier to, for example, identify a particular panelist within a household (e.g., "PANELIST0002_IPAD02", "Suzie's iPad", etc.).

In the illustrated example of FIG. 4B, the device identifiers associated with each of the MAC addresses includes a panelist identifier (e.g., "PANELIST0001"), a media device type (e.g., "XBOX", "PLAYSTATION", "IPAD", "SMARTTV", etc.), and a serial identifier (e.g., "01"). However, the device identifier may be formatted and/or constructed in any other fashion. In the illustrated example, the device identifier is a unique identifier that is not shared across media devices and/or media exposure measurement location 140. However, in some examples, the device identifier is not unique across multiple media exposure measurement location (but is preferably unique within a single media exposure measurement location). In such examples, the device identifier may be combined with a network communications monitor identifier and/or media exposure measurement location identifier (e.g., a unique identifier assigned to the panelist and/or panelist household).

Figure 5:
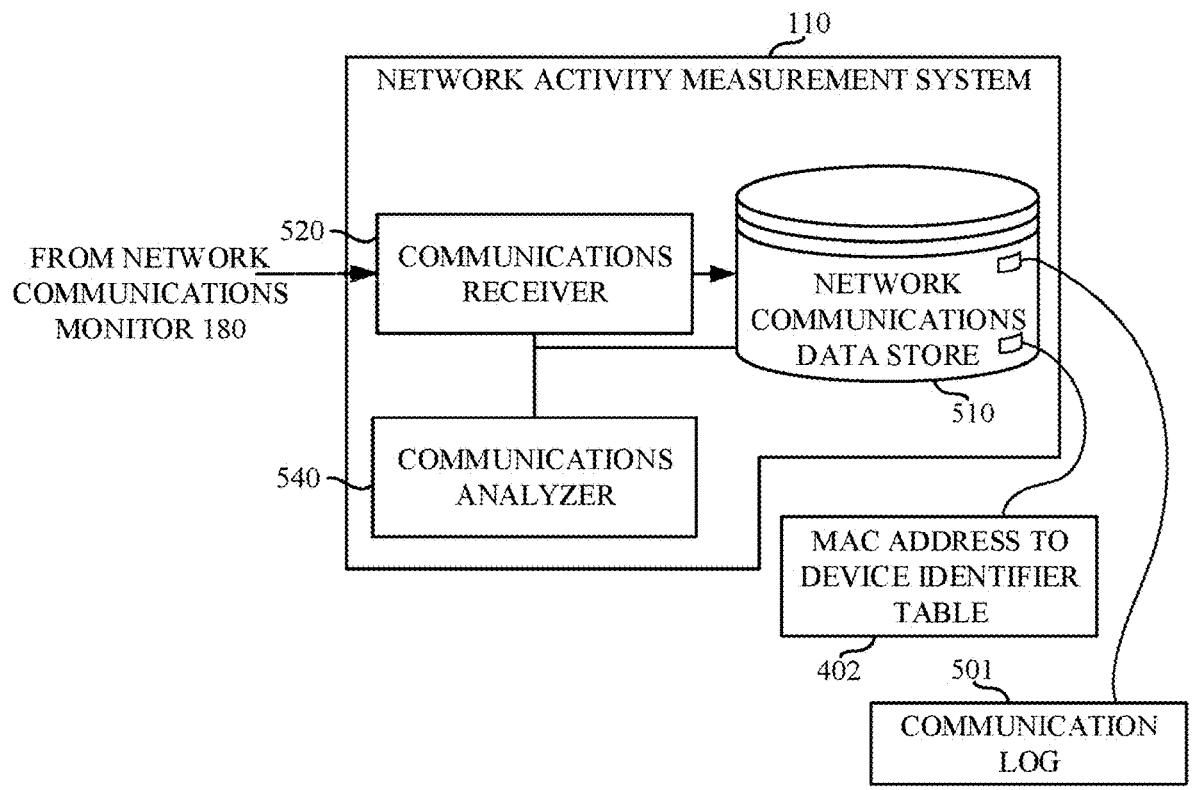
FIG. 5 is a block diagram of an example network activity measurement system to implement the example network activity measurement system of FIG. 1.

FIG. 5 is a block diagram of an example implementation of the example network activity measurement system 110 of FIG. 1. The example network activity measurement system 110 of FIG. 5 includes a communications receiver 520, a communications analyzer 540, and a network communications data store 510.

The communications receiver 520 of the illustrated example of FIG. 5 receives network communications data from the example network communications monitor 180 shown in FIGS. 1 and 4. In the illustrated example, the communications data receiver 520 is implemented by a processor executing instructions, but it could alternatively be implemented by an ASIC, DSP, FPGA, or other circuitry. In the illustrated example, the communications receiver 520 is implemented by a server which receives the network communications from the network communications monitor 180 via a network interface (e.g., an Ethernet connection). However, the communications receiver 520 may receive the network communications from the network communications monitor 180 via any other type of interface such as, for example, a universal serial bus (USB) connection, a Bluetooth connection, etc. The communications receiver 520 of the illustrated example stores the received network communications in the network communications data store 510.

The network communications data store 510 of the illustrated example of FIG. 5 may be implemented by any type(s) and/or number of device(s) and/or storage disks for storing data such as, for example, flash memory, magnetic media, optical media, etc. Furthermore, the data stored in the network communications data store 510 may be in any data format(s) such as, for example, binary data, comma delimited data, tab delimited data, structured query language (SQL) structures, etc. While, in the illustrated example, the network communications data store 510 is illustrated as a single database, the network communications data store 510 may be implemented by any number and/or type(s) of databases. In the illustrated example, the example network communications data store 510 stores the MAC address to device identifier table 402, and a communication log 501. The communication log 501 is described in further detail in connection with FIG. 5A.

The communications analyzer 540 of the illustrated example of FIG. 5 analyzes communications from the network devices 150 (received via the network communications monitor 180 and the communications receiver 520). In the illustrated example, the communications analyzer 540 is implemented by a processor executing instructions, but it could alternatively be implemented by an ASIC, DSP, FPGA, or other circuitry. The communications analyzer 540 may be implemented on the same physical processor as the communications receiver 520. The example communications analyzer 540 of FIG. 5 is implemented by a server which analyzes the communications from the media devices 150 to determine, for example, ownership and/or usage statistics of the media devices 150, relative rankings of usage and/or ownership of media devices 150, type(s) of uses of media devices 150 (e.g., whether a device is used for browsing the Internet, streaming media from the Internet, etc.), and/or other type(s) of network device information.

Figure 5A:
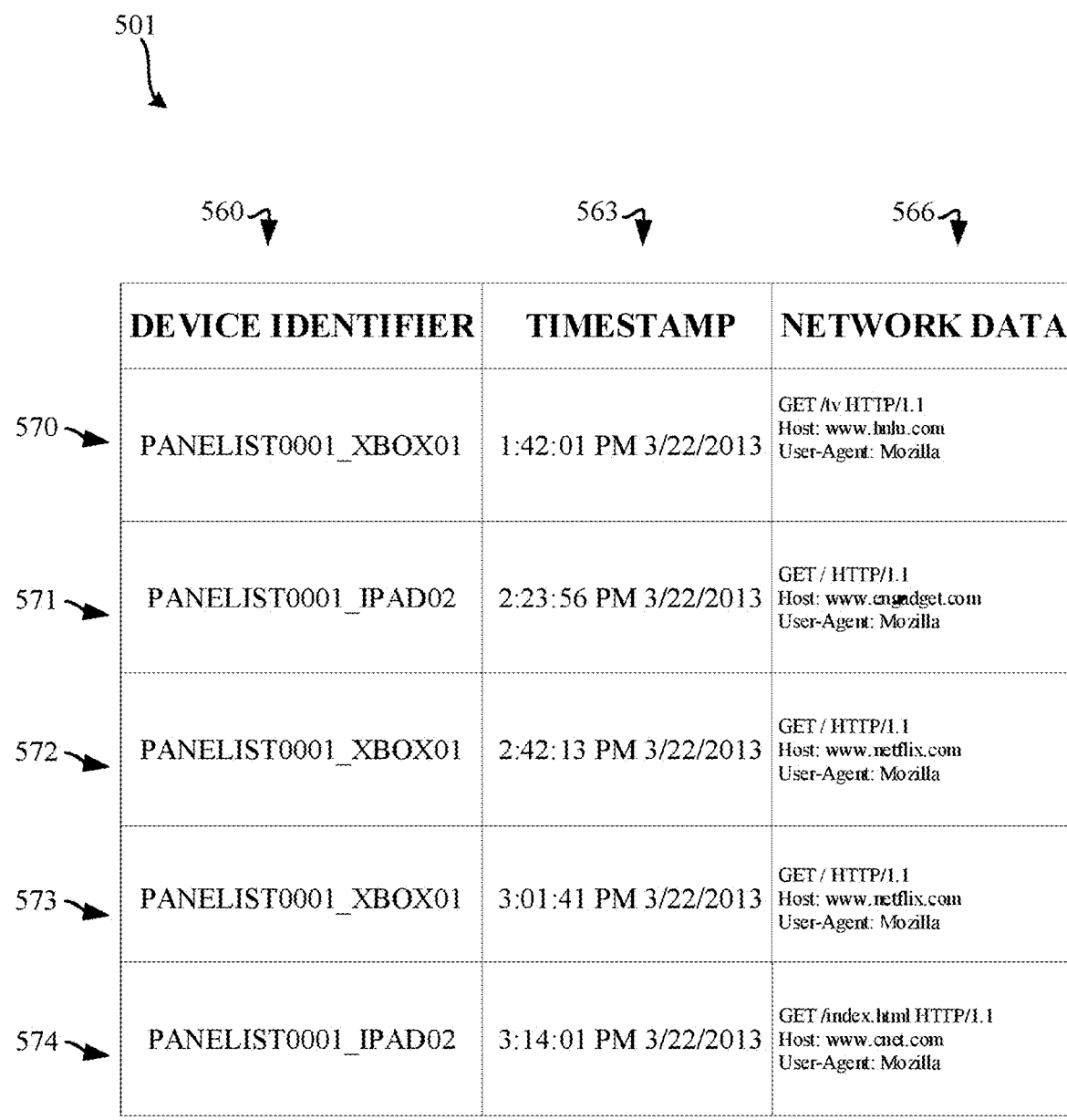
FIG. 5A is an example communication log that may be stored by the example network communications data store of the example network activity measurement system of FIGS. 1 and/or 5.

FIG. 5A is an example communication log 501 that may be stored by the example network communications data store 510 of the example network activity measurement system 110 of FIGS. 1 and/or 5. The example communication log 501 is transmitted to the network activity measurement system 110 by the network communications monitor 180. In the illustrated example, for simplicity, the communication log 501 represents communications received from a single network communications monitor 180 (e.g., network communications monitored at a single media exposure measurement location 140). However, in practice, the communication log 501 may represent communications received from multiple network communications monitors 180, associated with many different media exposure measurement locations 140. In the illustrated example, the communication log 501 includes a device identifier column 560, a timestamp column 563, and a network data column 566. The device identifier column 560 represents device identifiers as received from the network communications monitor 180 (and/or as translated by the communications analyzer 540 based on the MAC address). The timestamp column 563 represents a timestamp (e.g., a time of occurrence) associated with the network data of the network data column 566. The example network data column 566 includes HTTP headers of network communications monitored by the network communications monitor 180. However, any other information related to the communications may additionally or alternatively be stored such as, for example, an HTTP payload, FTP data, HTTPS data, etc.

The example data of the communications log 501 indicates that at a first time, the first media device 151 transmitted a request to "www.hulu.com" (row 570). Such a request indicates that the first media device 151 was used to present media retrieved from hulu. At a second time, the fourth media device 154 transmitted a request to "www.engadget.com" (row 571). The first media device then transmitted a request to "www.netflix.com" at a third time (row 572), and then another request to the same destination at a fourth time (row 573). The fourth media device 154 then transmitted a request to "www.cnet.com" at a fifth time (row 574). Based on the network data, the communications analyzer 540 may, for example, determine ownership and/or usage statistics of the media devices 150, determine relative rankings of usage and/or ownership of media devices 150, determine demographics that may more frequently use a particular type of media device, determine demographics that may more frequently use a particular media device for a certain function (e.g., streaming television, internet browsing, etc.), types of uses of media devices 150 (e.g., whether a device is used for browsing the Internet, streaming media from the Internet, etc.), and/or other types of network device information and/or media usage information (e.g., exposure statistics for various demographic groups).

While an example manner of implementing the network activity measurement system 110 of FIG. 1 has been illustrated in FIG. 5 and an example manner of implementing the network communications monitor 180 of FIG. 1 has been illustrated in FIG. 4, one or more of the elements, processes and/or devices illustrated in FIGS. 4 and/or 5 may be combined, divided, re-arranged, omitted, eliminated and/or implemented in any other way. Further, the example network communicator 405, the example communications process 410, the example communications data storer 415, the example network communications data store 420, the example communications transmitter 425, the example device information receiver 430, and/or, more generally, the example network communications monitor 180 of FIGS. 1 and 4 and/or the example network communications data store 510, the example communications receiver 520, the example communications analyzer 540, and/or, more generally, the example network activity measurement system 110 of FIGS. 1 and 5 may be implemented by hardware, software, firmware and/or any combination of hardware, software and/or firmware. Thus, for example, any of the example network communicator 405, the example communications process 410, the example communications data storer 415, the example network communications data store 420, the example communications transmitter 425, the example device information receiver 430, and/or, more generally, the example network communications monitor 180 of FIGS. 1 and 4 and/or the example network communications data store 510, the example communications receiver 520, the example communications analyzer 540, and/or, more generally, the example network activity measurement system 110 of FIGS. 1 and 5 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example network communicator 405, the example communications process 410, the example communications data storer 415, the example network communications data store 420, the example communications transmitter 425, the example device information receiver 430, and/or, more generally, the example network communications monitor 180 of FIGS. 1 and 4 and/or the example network communications data store 510, the example communications receiver 520, the example communications analyzer 540, and/or, more generally, the example network activity measurement system 110 of FIGS. 1 and 5 is/are hereby expressly defined to include a tangible computer readable storage device or storage disk such as a memory, a digital versatile disk (DVD), a compact disk (CD), a Blu-ray disk, etc. storing the software and/or firmware. Further still, the example network activity measurement system 110 of FIGS. 1 and/or 5, and/or the example network communications monitor 180 of FIGS. 1 and/or 4 may include one or more elements, processes and/or devices in addition to, or instead of, those illustrated in FIGS. 1, 4, and/or 5, and/or may include more than one of any or all of the illustrated elements, processes and devices.

Figure 6:
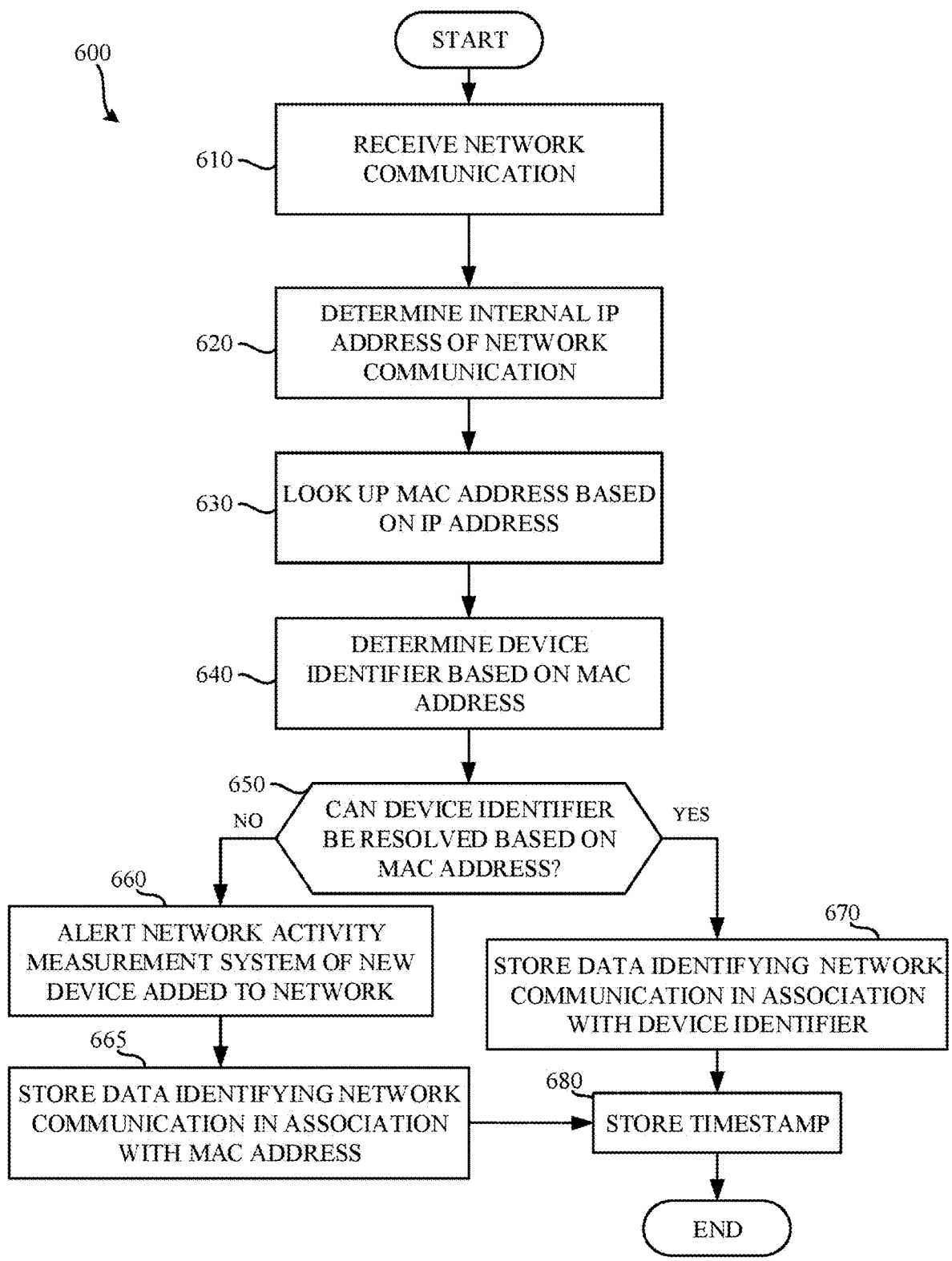
FIG. 6 is a flowchart representative of example machine-readable instructions which may be executed to implement the example network communications monitor of FIGS. 1 and/or 4 to identify network communications.
Figure 7:
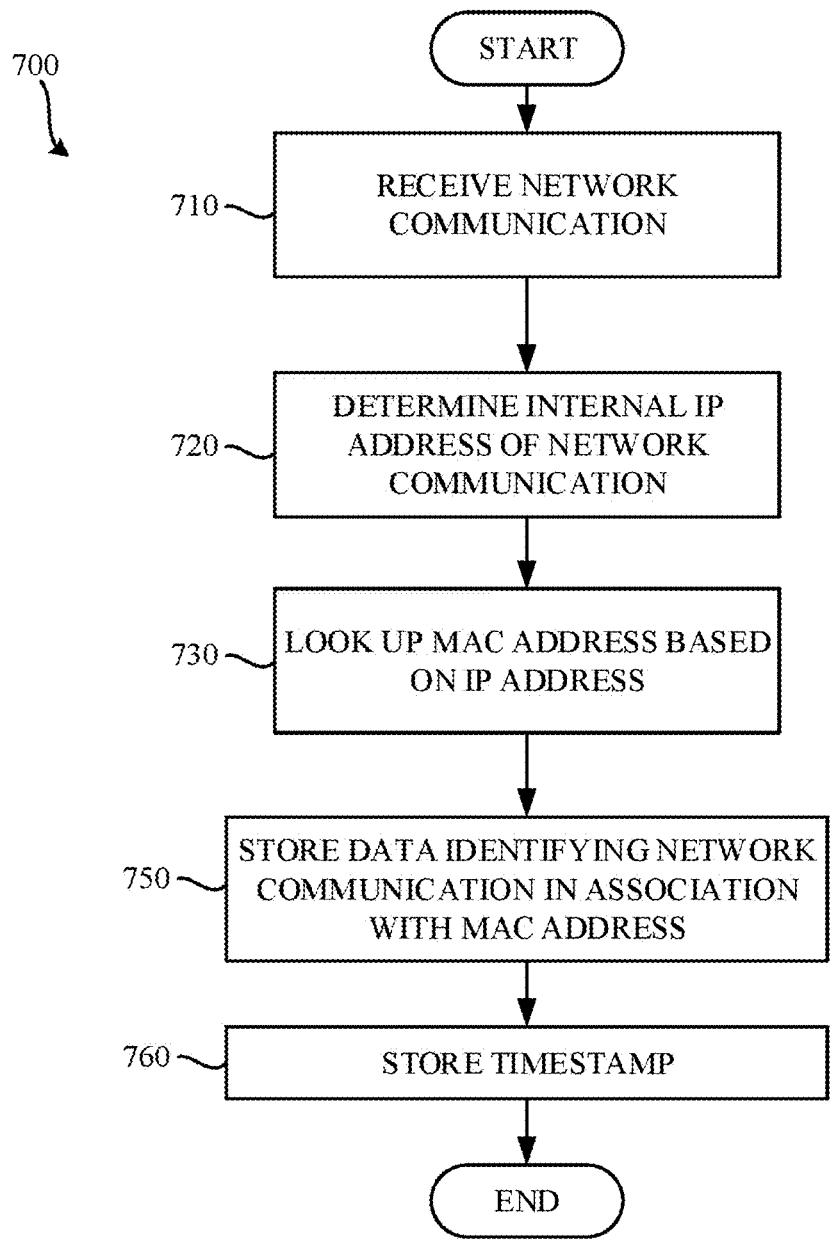
FIG. 7 is a flowchart representative of example machine-readable instructions which may be executed to implement the example network communications monitor of FIGS. 1 and/or 4 to identify network communications.
Figure 8:
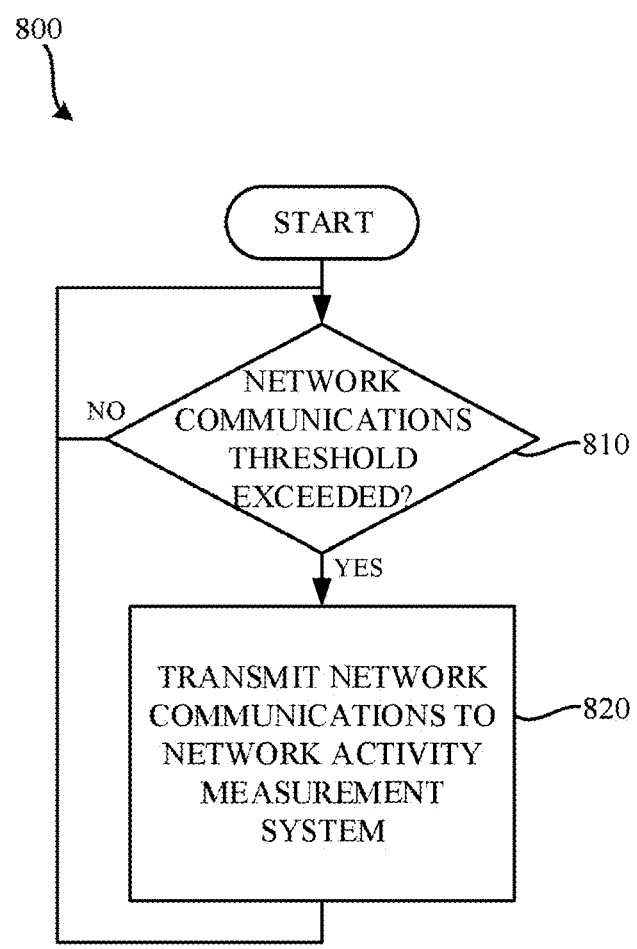
FIG. 8 is a flowchart representative of example machine-readable instructions which may be executed to implement the example network communications monitor of FIGS. 1 and/or 4 to transmit network communications.
Figure 9:
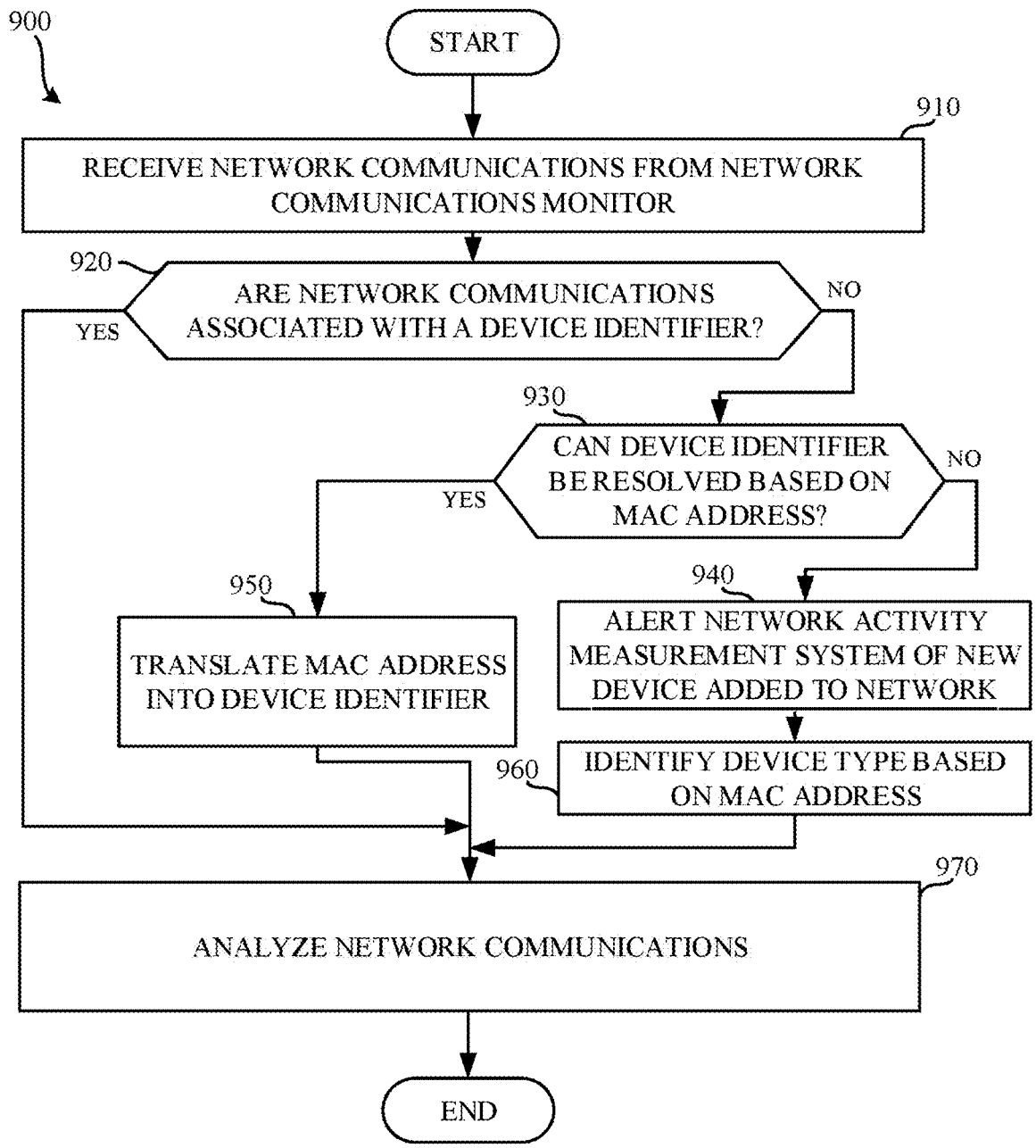
FIG. 9 is a flowchart representative of example machine-readable instructions which may be executed to implement the example network activity measurement system of FIGS. 1 and/or 5 to identify media devices.

Flowcharts representative of example machine readable instructions for implementing the example network communications monitor 180 of FIGS. 1 and/or 4 are shown in FIGS. 6, 7, or 8. Flowcharts representative of example machine readable instructions for implementing the example network activity measurement system 110 of FIGS. 1 and/or 5 is shown in FIG. 9. In these examples, the machine readable instructions comprise a program for execution by a processor such as the processor 1012 shown in the example processor platform 1000 discussed below in connection with FIG. 10. The program may be embodied in software stored on a tangible computer readable storage medium such as a CD-ROM, a floppy disk, a hard drive, a digital versatile disk (DVD), a Blu-ray disk, or a memory associated with the processor 1012, but the entire program and/or parts thereof could alternatively be executed by a device other than the processor 1012 and/or embodied in firmware or dedicated hardware. Further, although the example program is described with reference to the flowcharts illustrated in FIGS. 6, 7, 8, and/or 9, many other methods of implementing the example network activity measurement system 110 of FIGS. 1 and/or 5, and/or the example network communications monitor 180 of FIGS. 1 and/or 4 may alternatively be used. For example, the order of execution of the blocks may be changed, and/or some of the blocks described may be changed, eliminated, or combined.

As mentioned above, the example processes of FIGS. 6, 7, 8, and/or 9 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals. As used herein, "tangible computer readable storage medium" and "tangible machine readable storage medium" are used interchangeably. Additionally or alternatively, the example processes of FIGS. 6, 7, 8, and/or 9 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable device or disk and to exclude propagating signals. As used herein, when the phrase "at least" is used as the transition term in a preamble of a claim, it is open-ended in the same manner as the term "comprising" is open ended.

FIG. 6 is a flowchart representative of example machine-readable instructions 600 which may be executed to implement the example network communications monitor 180 of FIGS. 1 and 4 to monitor network communications. The machine-readable instructions 600 of FIG. 6 begin execution when the network communicator 405 receives network communications (block 610). In the illustrated example, the network communicator 405 receives network communications sent from the network gateway 145 to the network 125 and/or a device on the network 125. However, in some examples, the network communicator 405 also receives network communications sent from the network 125 and/or a device on the network 125 to the network gateway 145.

The communications processor 410 then determines the internal IP address of the media device involved in the network communication (block 620). In some examples, the media device may be the source (e.g., the originator) of the network communication, while in some other examples the media device may be the destination of the network communication. In the illustrated example, the communications processor 410 identifies the IP address by selecting an internal IP address involved in the communications. In some examples, the network communication may involve both a source and a destination that are internal to the LAN (e.g., a first media device on the LAN communicates with a second media device on the LAN). In such examples, the communications processor 410 may ignore the network communication. However, in some examples, the communications processor 410 may select the IP address of the source of the network communication as the IP address.

The communications processor 410 then performs a lookup of the MAC address based on the IP address (block 630). In the illustrated example, the communications processor 410 performs the lookup via the ARP table 401. The ARP table is maintained by the example network communicator 405 of the network communications monitor 180. However any other way of determining the MAC address of the IP address associated with the network communications may be used. The communications processor 410 then determines the device identifier based on the MAC address (block 640). In the illustrated example, the communications processor 410 determines the device identifier based on the MAC address identified by the lookup of block 630. However, in some examples, the communications processor 410 may determine the device identifier based on the IP address. In such an example, the network communicator 405 may maintain a table storing relationships between IP addresses of media devices on the network and their respective device identifiers. The communications processor 410 determines whether the device identifier can be resolved based on the MAC address (block 650).

If the device identifier can be resolved, the communications data storer 415 stores data identifying the network communication in association with the device identifier in the network communications data store 420 (block 670). If the device identifier cannot be resolved, the reason for not being resolved is likely that a new device has been added to the network. To account for such a situation, if the device identifier cannot be resolved, the communications processor 410 sends an alert to the network activity measurement system 110 of a new device added to the network (block 660). Such an alert enables the monitoring entity associated with the network activity measurement system 110 to contact the panelist (e.g., the homeowner) to inquire about the new device. If, for example, the panelist confirms to that a new device has been added, a device identifier may be issued for the new device. In some examples, an installer may be sent to the media exposure measurement location 140 to identify the media device 150 and/or the MAC address of the media device 150. The installer may interact with the device information receiver 430 to enter the device identifier and the MAC address of the media device so that the association can be recorded in the MAC address to device identifier table 402. In some examples, the installer may direct and/or otherwise instruct a user of the media device to interact with the device information receiver 430. For example, the installer may conduct a telephone call with the user to convey such instructions. While in the illustrated example, the installer is described as an active party (e.g., a party that actively inputs information into an interface of the device information receiver 430, a party that instructs a user of the media device to do the same, etc.), in some examples the installer may be a set of instructions (e.g., an instruction booklet, an email message, a SMS message, etc.) that instructs the user to enter an device identifier of a media device via an interface of the device information receiver. If a new device has not been added (e.g., the media device was temporarily used at the media exposure measurement location 140, for instance, by a house guest), a device identifier may not be issued. If the device identifier cannot be resolved, the communications data storer 415 stores data identifying the network communication in association with the MAC address in the network communications data store 420 (block 665).

In the illustrated example, the communications processor 410 timestamps the network communications stored in the network communications data store 410 (block 680). Timestamping (e.g., recording a time that an event occurred) enables accurate identification and/or correlation of media that was presented.

In some examples, the communications processor 410 inspects the network communications to identify HTTP communications. That is, the communications processor 410 and/or the communications data storer 415 may store network communications only when the communications are HTTP communications. In such an example, the HTTP communications are stored in the network communications data store 420 by the communications data storer 415. In some examples, the communications processor 410 inspects the network communications to identify a type and/or protocol of network communication (e.g., HTTP communications, DNS communications, SIP communications, FTP communications, etc.) by for example, inspecting a header of network communication (e.g., a transmission control packet (TCP) header, a user datagram protocol (UDP) header). In some examples, the communications processor 410 inspects the network communications to identify a source and/or a destination of the network communications by for example, inspecting a header of network communication (e.g., a transmission control packet (TCP) header, a user datagram protocol (UDP) header) . . . . In such an example, communications might only be stored when they are requests transmitted to particular providers of Internet services (e.g., Netflix®, YouTube®, Hulu®, Pandora®, Last.fm®, etc.) and/or when the communications originated from a particular type of network device (e.g., an Internet enabled television, a video game console, etc.), depending on the nature of the study.

In some examples, the communications processor 410 processes the received network communications to identify particular portion(s) of the network communications. For example, to reduce the amount of storage space required to store the network communications, the communications processor 410 may remove and/or compress one or more portion(s) of the network communications.

FIG. 7 is a flowchart representative of example machine-readable instructions 700 which may be executed to implement the example network communications monitor 180 of FIGS. 1 and 4 to monitor network communications. In some examples, the MAC address to device identifier table 402 is stored at the network activity measurement system 110 rather than at that the network communications monitor 180. In such an example, the network communications monitor 180 may not be able to determine a device identifier and may instead store the network communication in association with the MAC address. As described above, FIG. 6 illustrates example instructions 600 which, when executed, attempt to identify the media device using a device identifier. In contrast, FIG. 7 illustrates example instructions 700 which, when executed, attempt to identify the media device based on a MAC address, leaving for a translation from MAC address to device identifier to be performed at the network activity measurement system 110.

The machine-readable instructions 700 of FIG. 7 begin execution when the network communicator 405 receives network communications (block 710). In the illustrated example, the network communicator 405 receives network communications sent from the network gateway 145 to the network 125 and/or a device on the network 125. However, in some examples, the network communicator 405 also receives network communications sent from the network 125 and/or a device on the network 125 to the network gateway 145.

The communications processor 410 then determines the internal IP address of the media device involved in the network communication (block 720). In some examples, the media device may be the source (e.g., the originator) of the network communication, while in some other examples the media device may be the destination of the network communication. In the illustrated example, the communications processor 410 identifies the IP address by selecting an internal IP address involved in the communications. In some examples, the network communication may involve both a source and a destination that are internal to the LAN (e.g., a first media device on the LAN communicates with a second media device on the LAN). In such examples, the communications processor 410 may ignore the network communication. However, in some examples, the communications processor 410 may select the IP address of the source of the network communication as the IP address.

The communications processor 410 then performs a lookup of the MAC address based on the IP address (block 730). In the illustrated example, the communications processor 410 performs the lookup via the ARP table 401. In the illustrated example, the ARP table is maintained by the example network communicator 405 of the network communications monitor 180. However any other way of determining the MAC address of the IP address associated with the network communications may be used.

The communications data storer 415 stores data identifying the network communication in association with the MAC address in the network communications data store 420 (block 750). The network communication and the associated MAC address may be transmitted to the network activity measurement system 110 at a later time. In the illustrated example, the communications processor 410 timestamps the network communications stored in the network communications data store 410 (block 760). Timestamping (e.g., recording a time that an event occurred) enables accurate identification and/or correlation of media that was presented and also enables alignment of the media identification data with audience composition data collected by, for example, a people meter to thereby enable correlation of an audience demographic to media exposure.

FIG. 8 is a flowchart representative of example machine-readable instructions 800 which may be executed to implement the example network communications monitor 180 of FIGS. 1 and 4 to transmit stored network communications. The machine-readable instructions 800 of FIG. 8 begin execution at block 805 when the communications transmitter 425 determines whether a network communications threshold has been exceeded (block 810). In the illustrated example, the threshold is a time limit specifying that network communications are transmitted once every day. Additionally or alternatively, any other periodic and/or aperiodic approach to transmitting network communications from the network communications monitor 180 may be used. For example, the network communications threshold might be based on an amount of network communications data stored in the network communications data store 420.

If the network communications threshold has not been exceeded (block 810), the communications transmitter 425 continues to determine whether the data identifying the network communications have exceeded the network communications threshold. When the network communications threshold has been exceeded (block 810), the communications transmitter 425 transmits the data identifying the network communications to the network communications data receiver 340 of the network activity measurement system 110 as a log of network activity (block 820). In the illustrated example, the data identifying the network communications is transmitted in association with an identifier of the network communications monitor 180. The identifier of the network communications monitor 180, in some examples, enables identification of the source of network communications analyzed by the communications analyzer 540 of the network activity measurement system 110.

In the illustrated example, the communications transmitter 425 transmits the stored network communications via the network communicator 405. However, in some examples, the communications transmitter 425 transmits the stored network communications via a local connection such as, for example, a serial connection, a universal serial bus (USB) connection, a Bluetooth connection, etc. In some examples, the network communications monitor 180 may be physically moved to a location of the network activity measurement system 110 by, for example, physically mailing the network communications monitor 180, etc.

FIG. 9 is a flowchart representative of example machine-readable instructions 900 which may be executed to implement the example network activity measurement system 110 of FIGS. 1 and 5 to identify media devices. In particular, the example flowchart of FIG. 9 illustrates an example process wherein the network activity measurement system 110 receives network communications from the network communications monitor 180 and analyzes the same. The example machine-readable instructions 900 of FIG. 9 begin execution when the communications receiver 520 receives network communications from the network communications monitor 180 (block 910). In the illustrated example, the network communications are received from the network communications monitor 180 via a network connection, such as, for example, the Internet. However, the network communications data may be received in any other fashion. For example, the network communications data may be received via a universal serial bus (USB) connection. In such an example, the network communications monitor 180 may be mailed to a location of the network activity measurement system 110. Additionally or alternatively, a storage device (e.g., a memory stick, a compact disk, a hard disk drive, etc.) may be mailed and/or otherwise sent to the network activity measurement system. Upon receiving the network communications data, the communications receiver 520 stores the network communications in the network communications data store 510.

In some examples, the MAC address to device identifier table 402 is stored at the network communications data store 510 of the network activity measurement system 110. In such an example, the communications analyzer 540 determines if the received network communications are received in association with a device identifier (block 920). If the network communications are not received in association with a device identifier (block 920) (e.g., the network communications are received in association with a MAC address), the communications analyzer 540 determines if a device identifier can be resolved based on the MAC address (block 930). Such a determination is made by the communications analyzer 540 by performing a lookup in the MAC address to device identifier table 402. If the device identifier can be resolved based on the MAC address, the communications analyzer 950 translates the MAC address identifier into the device identifier (block 950).

If the device identifier cannot be resolved based on the MAC address, an alert is thrown by the communications analyzer 540. Such an alert enables the monitoring entity associated with the network activity measurement system 110 to contact the panelist (e.g., the homeowner) to inquire about the new device. In the illustrated example, the alert identifies the identifier of the network communications monitor 180, so that the monitoring entity associated with the network activity measurement system 110 can contact the correct panelist and/or household regarding the newly added device. If, for example, the panelist confirms that a new device has been added, a device identifier may be issued for the new device and/or may be stored in the MAC address to device identifier table. In some examples, an installer may be sent to the media exposure measurement location 140 to identify the new media device 150 and/or the MAC address of the new media device 150. If a new device has not been added (e.g., the media device was temporarily used at the media exposure measurement location 140), a device identifier may not be issued.

If the device identifier cannot be resolved, the communications analyzer 540 identifies the media device 150 associated with the network communications based on the MAC address (block 960). For example, the communications analyzer may parse the MAC address to identify an OUI of the MAC address. Because the OUI is manufacturer and/or model specific, the communications analyzer 540 can identify a make and/or model of the media device associated with the network communication. In a similar regard, the identification of the make and/or model of the media device may be useful when contacting the panelist for inquiring about the newly added device. For example, the make and/or model may facilitate questioning the panelist to confirm whether a particular new device has been added to the network (e.g., "Have you recently added an Apple iPad to your network? If so, is that device associated with a particular user in the household?"). If the panelist answers in the affirmative, a device identifier indicating that the device is associated with the panelist (e.g., "PANELIST0005_IPAD") may be stored in association with the MAC address of the device in the MAC address to device identifier table 402.

If the network communications are associated with a device identifier (block 920), after the MAC address is translated to the device identifier (block 950), and/or after a manufacturer and/or model of the media device is identified based on the MAC address (block 960), the communications analyzer 540 analyzes the communications from the media devices 150 to identify media devices (block 970). In the illustrated example, the example communications analyzer 540 analyzes the communications to determine ownership and/or usage statistics of the media devices 150. However, in some examples, the example communications analyzer 540 may additionally or alternatively analyze the communications to determine relative rankings of usage and/or ownership of media devices 150, types of uses of media devices 150 (e.g., whether a device is used for browsing the Internet, streaming media from the Internet, etc.), and/or other types of media device information.

Figure 10:
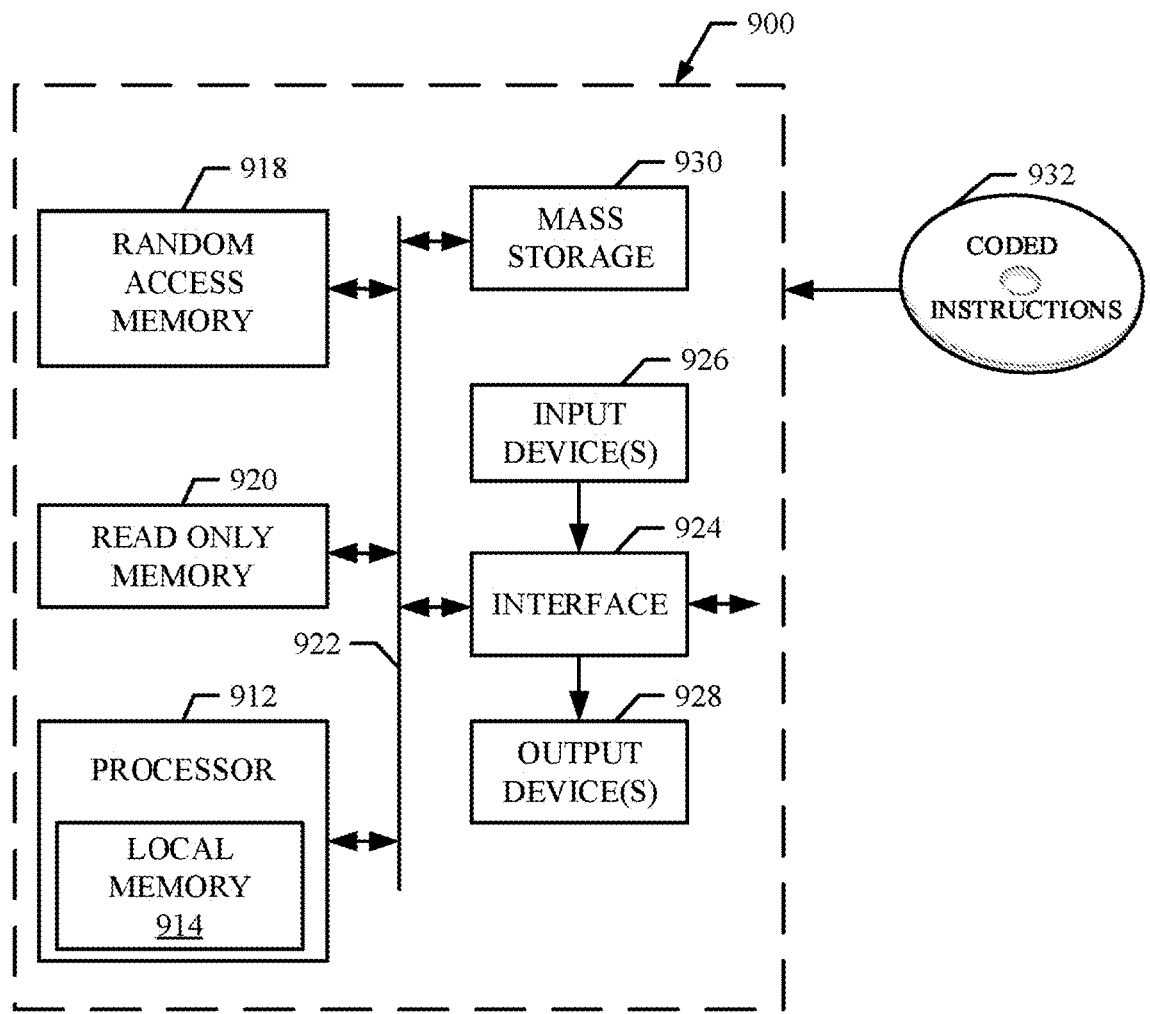
FIG. 10 is a block diagram of an example processor platform capable of executing the example machine-readable instructions of FIGS. 6, 7, 8, and/or 9 to implement the example network activity measurement system of FIGS. 1 and/or 5, and/or the example network communications monitor of FIGS. 1 and/or 4.

FIG. 10 is a block diagram of an example processor platform 1000 capable of executing the instructions of FIGS. 6, 7, 8, and/or 9 to implement the example network activity measurement system 110 of FIGS. 1 and/or 5, and/or the example network communications monitor 180 of FIGS. 1 and/or 4. The processor platform 1000 can be, for example, a server, a personal computer, a mobile device (e.g., a cell phone, a smart phone, a tablet such as an iPad™), a personal digital assistant (PDA), an Internet appliance, a set top box, or any other type of computing device.

The processor platform 1000 of the illustrated example includes a processor 1012. The processor 1012 of the illustrated example is hardware. For example, the processor 1012 can be implemented by one or more integrated circuits, logic circuits, microprocessors or controllers from any desired family or manufacturer.

The processor 1012 of the illustrated example includes a local memory 1013 (e.g., a cache). The processor 1012 of the illustrated example is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1016 may be implemented by flash memory and/or any other desired type of memory device. Access to the main memory 1014, 1016 is controlled by a memory controller.

The processor platform 1000 of the illustrated example also includes an interface circuit 1020. The interface circuit 1020 may be implemented by any type of interface standard, such as an Ethernet interface, a universal serial bus (USB), and/or a PCI express interface.

In the illustrated example, one or more input devices 1022 are connected to the interface circuit 1020. The input device(s) 1022 permit(s) a user to enter data and commands into the processor 1012. The input device(s) can be implemented by, for example, a keyboard, a button, a mouse, a touchscreen, a track-pad, a trackball, isopoint and/or a voice recognition system.

One or more output devices 1024 are also connected to the interface circuit 1020 of the illustrated example. The output devices 1024 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 1020 of the illustrated example, thus, typically includes a graphics driver card, a graphics driver chip or a graphics driver processor.

The interface circuit 1020 of the illustrated example also includes a communication device such as a transmitter, a receiver, a transceiver, a modem and/or network interface card to facilitate exchange of data with external machines (e.g., computing devices of any kind) via a network 1026 (e.g., an Ethernet connection, a digital subscriber line (DSL), a telephone line, coaxial cable, a cellular telephone system, etc.).

The processor platform 1000 of the illustrated example also includes one or more mass storage devices 1028 for storing software and/or data. Examples of such mass storage devices 1028 include floppy disk drives, hard drive disks, compact disk drives, Blu-ray disk drives, RAID systems, and digital versatile disk (DVD) drives.

The coded instructions 1032 of FIGS. 6, 7, 8, and/or 9 may be stored in the mass storage device 1028, in the volatile memory 1014, in the non-volatile memory 1016, and/or on a removable tangible computer readable storage medium such as a CD or DVD.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

The invention claimed is:

1. A computing system comprising:
   a server; and
   a network communications monitor for monitoring a local area network in a panelist household, the network communications monitor comprising:
      a network interface for connecting the network communications monitor to a router in the panelist household,
      at least one processor, and
      a non-transitory computer-readable medium having stored therein instructions that, upon execution by the at least one processor, cause the network communications monitor to perform operations comprising:
         detecting, via the network interface of the network communications monitor, a media device that is connected to the local area network and separate from the network communications monitor, wherein the media device is configured for receiving media from a media provider for presentation at the panelist household;
         identifying a media access control (MAC) address of the media device; and
         transmitting data indicative of the MAC address to the server,
      wherein the server is configured to detect, based on the data indicative of the MAC address, that the media device is a new device that has been added to the local area network.

2. The computing system of claim 1, wherein detecting that the media device is a new device enables an audience measurement entity to contact a panelist of the panelist household to inquire about the new device.

3. The computing system of claim 1, wherein detecting that the media device is a new device comprises:
   determining, based on the MAC address, that the media device is absent from a list identifying panelist media devices to be monitored within the panelist household; and
   based on determining that the media device is absent from the list, detecting that the media device is a new device.

4. The computing system of claim 1, wherein the operations further comprise:
   after transmitting the data indicative of the MAC address to the server, receiving confirmation that the media device is a panelist media device of the panelist household; and
   adding the media device to a list of panelist media devices to be monitored within the panelist household.

5. The computing system of claim 4, wherein the operations further comprise:
   inspecting traffic between the media device and a resource outside of the local area network;
   identifying a network communication between the media device and the resource; and
   storing data identifying the network communication in association with the media device.

6. The computing system of claim 1, wherein identifying the MAC address comprises:
   determining an internal IP address of the media device; and
   identifying the MAC address using the internal IP address and a mapping of internal IP addresses to MAC addresses.

7. The computing system of claim 1, wherein detecting the media device comprises inspecting traffic between the media device and a resource outside of the local area network.

8. A method comprising:
   detecting, by a network communications monitor in a panelist household, a media device that is connected to a local area network and separate from the network communications monitor, wherein the network communications monitor comprises a network interface for connecting the network communications monitor to a router in the panelist household, and wherein the media device is configured for receiving media from a media provider for presentation at the panelist household;
   identifying, by the network communications monitor, a media access control (MAC) address of the media device; and
   detecting, based on the MAC address, that the media device is a new device that has been added to the local area network,
   wherein detecting that the media device is a new device enables an audience measurement entity to contact a panelist of the panelist household to inquire about the new device.

9. The method of claim 8, wherein detecting that the media device is a new device comprises:
   determining, based on the MAC address, that the media device is absent from a list identifying panelist media devices to be monitored within the panelist household; and
   based on determining that the media device is absent from the list, detecting that the media device is a new device.

10. The method of claim 8, further comprising:
    obtaining confirmation that the media device is a panelist media device of the panelist household; and
    adding the media device to a list of panelist media devices to be monitored within the panelist household.

11. The method of claim 10, further comprising:
    inspecting traffic between the media device and a resource outside of the local area network;
    identifying a network communication between the media device and the resource; and
    storing data identifying the network communication in association with the media device.

12. The method of claim 8, wherein identifying the MAC address comprises:
    determining an internal IP address of the media device; and
    identifying the MAC address using the internal IP address and a mapping of internal IP addresses to MAC addresses.

13. The method of claim 8, wherein detecting the media device comprises inspecting traffic between the media device and a resource outside of the local area network.

14. The method of claim 13, wherein the media device is wirelessly connected to the local area network.

15. A network communications monitor comprising:
a network interface for connecting the network communications monitor to a router in a panelist household;
at least one processor; and
a non-transitory computer-readable medium having stored therein instructions that, upon execution by the at least one processor, cause the network communications monitor to perform operations comprising:
  detecting, via the network interface of the network communications monitor, a media device that is connected to a local area network and separate from the network communications monitor, wherein the media device is configured for receiving media from a media provider for presentation at the panelist household,
  identifying a media access control (MAC) address of the media device, and
  transmitting data indicative of the MAC address to a server, wherein the server is configured to detect, based on the data indicative of the MAC address, that the media device is a new device that has been added to the local area network.

16. The network communications monitor of claim 15, wherein detecting that the media device is a new device enables an audience measurement entity to contact a panelist of the panelist household to inquire about the new device.

17. The network communications monitor of claim 15, wherein detecting that the media device is a new device comprises:
  determining, based on the MAC address, that the media device is absent from a list identifying panelist media devices to be monitored within the panelist household; and
  based on determining that the media device is absent from the list, detecting that the media device is a new device.

18. The network communications monitor of claim 15, wherein the operations further comprise:
  after transmitting the data indicative of the MAC address to the server, receiving confirmation that the media device is a panelist media device of the panelist household; and
  adding the media device to a list of panelist media devices to be monitored within the panelist household.

19. The network communications monitor of claim 18, wherein the operations further comprise:
  inspecting traffic between the media device and a resource outside of the local area network;
  identifying a network communication between the media device and the resource; and
  storing data identifying the network communication in association with the media device.

20. The network communications monitor of claim 15, wherein identifying the MAC address comprises:
  determining an internal IP address of the media device; and
  identifying the MAC address using the internal IP address and a mapping of internal IP addresses to MAC addresses.

* * * * *